(12) United States Patent
Herring et al.

(10) Patent No.: US 10,417,878 B2
(45) Date of Patent: Sep. 17, 2019

(54) METHOD, COMPUTER PROGRAM PRODUCT, AND SYSTEM FOR PROVIDING A SENSOR-BASED ENVIRONMENT

(71) Applicant: Toshiba Global Commerce Solutions Holdings Corporation, Tokyo (JP)

(72) Inventors: Dean Frederick Herring, Youngsville, NC (US); Brad Matthew Johnson, Raleigh, NC (US); Ankit Singh, Morrisville, NC (US); Jeffrey John Smith, Raleigh, NC (US); Adrian Xavier Rodriquez, Raleigh, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 618 days.

(21) Appl. No.: 14/663,190

(22) Filed: Mar. 19, 2015

(65) Prior Publication Data
US 2016/0110772 A1   Apr. 21, 2016

Related U.S. Application Data

(60) Provisional application No. 62/064,323, filed on Oct. 15, 2014.

(51) Int. Cl.
*G06Q 30/00* (2012.01)
*G07G 1/00* (2006.01)
(Continued)

(52) U.S. Cl.
CPC ........... *G07G 1/0054* (2013.01); *G01B 11/00* (2013.01); *G01G 19/4144* (2013.01);
(Continued)

(58) Field of Classification Search
CPC .................................................. G06Q 30/0633
See application file for complete search history.

(56) References Cited

U.S. PATENT DOCUMENTS

| 5,666,157 A | 9/1997 | Aviv |
| 7,168,618 B2 | 1/2007 | Schwartz |

(Continued)

FOREIGN PATENT DOCUMENTS

| GB | 2368928 A | 5/2002 |
| WO | 2002021426 | 3/2002 |
| WO | 2008031163 A1 | 3/2008 |

*Primary Examiner* — Bennett M Sigmond
*Assistant Examiner* — Scott C Anderson
(74) *Attorney, Agent, or Firm* — Patterson + Sheridan, LLP

(57) ABSTRACT

Method, computer program product, and system to trigger one or more events during an interaction of a person with an item and within an environment having a plurality of items. The method includes acquiring, using a first visual sensor disposed within the environment, image information including the item and identifying the item using the image information. The method further includes acquiring, using a second visual sensor disposed within the environment, behavior information for the person relative to the identified item, analyzing the behavior information to identify at least a first behavior of the person, and classifying the first behavior into one of a number of predefined behavior types. The method further includes performing, based on the identified item and the classified first behavior, one or more predefined events.

20 Claims, 15 Drawing Sheets

(51) Int. Cl.

| | | |
|---|---|---|
| G01G 19/414 | (2006.01) | |
| G06Q 20/18 | (2012.01) | |
| G06Q 20/20 | (2012.01) | |
| G06Q 10/08 | (2012.01) | |
| G06K 9/00 | (2006.01) | |
| G06K 9/20 | (2006.01) | |
| G06Q 30/06 | (2012.01) | |
| G01S 19/13 | (2010.01) | |
| G06Q 20/32 | (2012.01) | |
| H04N 5/225 | (2006.01) | |
| H04N 7/18 | (2006.01) | |
| G06Q 30/02 | (2012.01) | |
| G06K 9/62 | (2006.01) | |
| G06K 9/78 | (2006.01) | |
| G06F 1/16 | (2006.01) | |
| G06F 3/01 | (2006.01) | |
| G06K 9/46 | (2006.01) | |
| G06T 11/60 | (2006.01) | |
| H04N 5/232 | (2006.01) | |
| G01B 11/00 | (2006.01) | |
| G06T 7/66 | (2017.01) | |
| G01G 19/40 | (2006.01) | |
| G01B 11/02 | (2006.01) | |

(52) U.S. Cl.
CPC .............. *G01S 19/13* (2013.01); *G06F 1/163* (2013.01); *G06F 3/012* (2013.01); *G06F 3/013* (2013.01); *G06K 9/00221* (2013.01); *G06K 9/00255* (2013.01); *G06K 9/00288* (2013.01); *G06K 9/00362* (2013.01); *G06K 9/00536* (2013.01); *G06K 9/00577* (2013.01); *G06K 9/00624* (2013.01); *G06K 9/209* (2013.01); *G06K 9/46* (2013.01); *G06K 9/6201* (2013.01); *G06K 9/6267* (2013.01); *G06K 9/78* (2013.01); *G06Q 10/087* (2013.01); *G06Q 20/18* (2013.01); *G06Q 20/204* (2013.01); *G06Q 20/208* (2013.01); *G06Q 20/209* (2013.01); *G06Q 20/322* (2013.01); *G06Q 30/016* (2013.01); *G06Q 30/0224* (2013.01); *G06Q 30/0235* (2013.01); *G06Q 30/0251* (2013.01); *G06Q 30/0269* (2013.01); *G06Q 30/0609* (2013.01); *G06Q 30/0623* (2013.01); *G06Q 30/0629* (2013.01); *G06Q 30/0631* (2013.01); *G06Q 30/0633* (2013.01); *G06Q 30/0635* (2013.01); *G06Q 30/0639* (2013.01); *G06T 7/66* (2017.01); *G06T 11/60* (2013.01); *G07G 1/0045* (2013.01); *G07G 1/0063* (2013.01); *G07G 1/0072* (2013.01); *H04N 5/225* (2013.01); *H04N 5/232* (2013.01); *H04N 7/181* (2013.01); *G01B 11/02* (2013.01); *G01G 19/40* (2013.01); *G06K 2009/00328* (2013.01); *G06K 2209/17* (2013.01); *G06T 2207/30232* (2013.01)

(56) References Cited

U.S. PATENT DOCUMENTS

| | | |
|---|---|---|
| 7,762,458 B2 | 7/2010 | Stawar et al. |
| 8,219,438 B1 * | 7/2012 | Moon ............... G06Q 30/0201 705/7.29 |
| 8,289,162 B2 | 10/2012 | Mooring et al. |
| 8,391,851 B2 | 3/2013 | Rhoads et al. |
| 8,419,433 B2 | 4/2013 | Do et al. |
| 8,659,417 B1 | 2/2014 | Trundle et al. |
| 8,851,372 B2 | 10/2014 | Zhou et al. |
| 2002/0109600 A1 | 8/2002 | Mault et al. |
| 2006/0018516 A1 * | 1/2006 | Masoud ............ G06K 9/00342 382/115 |
| 2010/0332288 A1 * | 12/2010 | Higgins ................ G06Q 30/02 705/14.45 |
| 2011/0131005 A1 | 6/2011 | Ueshima et al. |
| 2011/0305369 A1 | 12/2011 | Bentley et al. |
| 2012/0074227 A1 * | 3/2012 | Ferren ............... G02B 13/0065 235/462.21 |
| 2012/0243767 A1 * | 9/2012 | Nakano ............. G06K 9/0014 382/133 |
| 2012/0271715 A1 | 10/2012 | Morton et al. |
| 2013/0024265 A1 * | 1/2013 | Lotzof ............... G06Q 30/0229 705/14.27 |
| 2013/0185155 A1 * | 7/2013 | Colando ............ G06Q 30/0215 705/14.54 |
| 2014/0365334 A1 | 12/2014 | Hurewitz |
| 2014/0365336 A1 | 12/2014 | Hurewitz |
| 2015/0012396 A1 | 1/2015 | Puerini et al. |
| 2015/0019391 A1 | 1/2015 | Kumar et al. |

* cited by examiner

METHOD, COMPUTER PROGRAM PRODUCT, AND SYSTEM FOR PROVIDING A SENSOR-BASED ENVIRONMENT

CROSS-REFERENCE TO RELATED APPLICATIONS

This application claims benefit of U.S. provisional patent application Ser. No. 62/064,323, filed Oct. 15, 2014, entitled "Integrated Shopping Environment," which is herein incorporated by reference.

BACKGROUND

The present disclosure relates to a sensor-based environment, and more specifically, to providing a person with an adaptive personal experience within the sensor-based environment using field of view and behavior information for the person.

Figure 1:
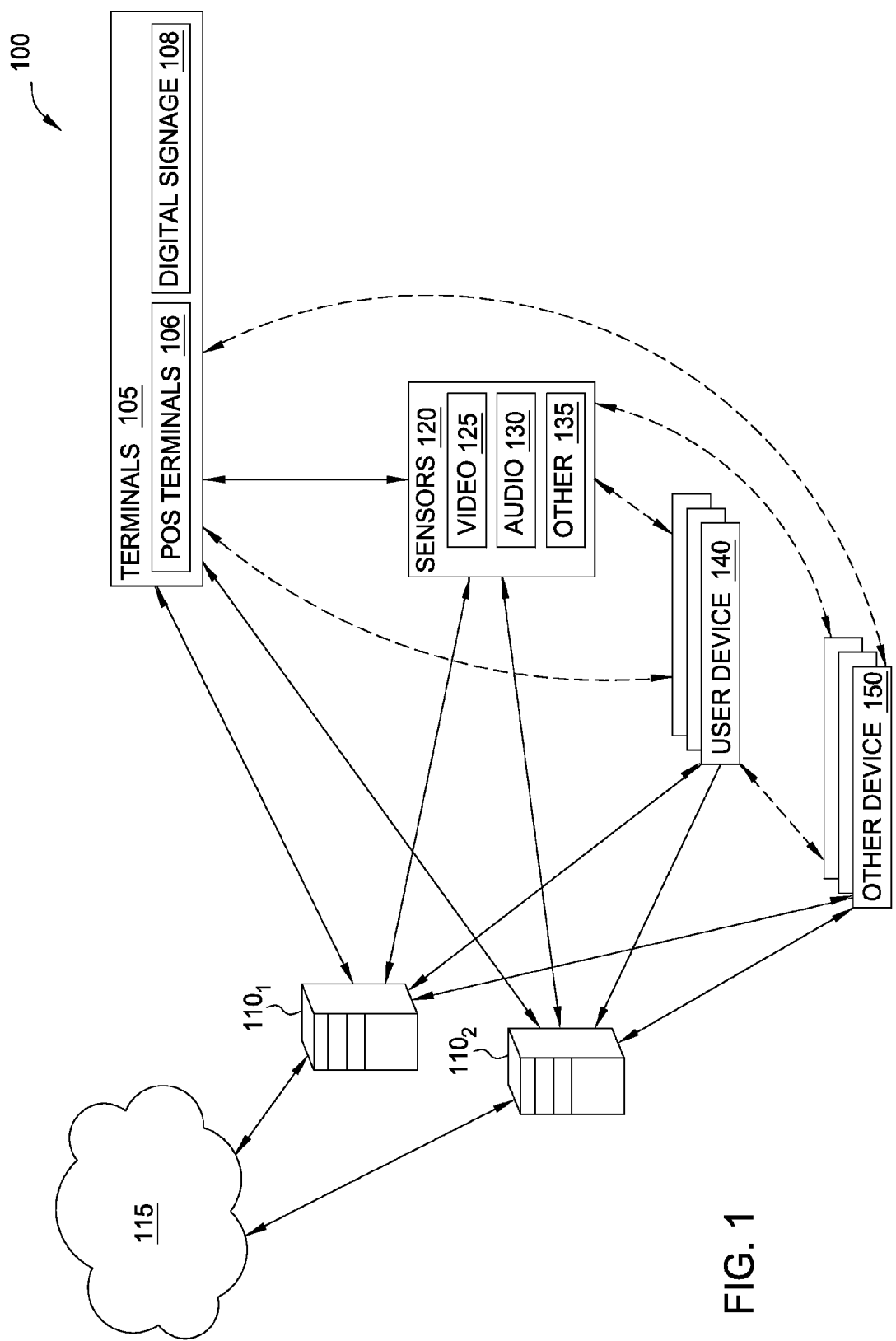
FIG. 1 illustrates an integrated shopping environment, according to one embodiment.

To facilitate understanding, identical reference numerals have been used, where possible, to designate identical elements that are common to the figures. It is contemplated that elements disclosed in one embodiment may be beneficially utilized on other embodiments without specific recitation. The illustrations referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Aspects of the current disclosure relate to an integrated environment capable of providing a person with a personalized, automated, and adaptive experience within the environment. Different sensor devices may be deployed within the environment and networked with various computing devices such as point-of-sale (POS) terminals, digital signage, servers, and mobile or handheld computing devices to seamlessly integrate mobile technologies and e-commerce into traditional experiences.

A retailer may use visual sensors within the environment to compile environmental data and process to determine various items within a person's field of view and relate the observed behavior in interacting with the items to determine personal preferences. The compiled data may be used to provide timely, tailored recommendations in real-time to the person to more effectively influence their experience. While generally discussed in context of a shopping environment, such as a retail store, the techniques disclosed herein may be suitably adapted to provide an adaptive experience for persons in other environments (e.g., libraries, museums, classrooms, hospitals, etc.).

FIG. 1 illustrates an integrated shopping environment, according to one embodiment. As shown, environment 100 includes a plurality of terminals 105, a plurality of servers $110_1$, $110_2$ coupled with a network 115, one or more sensors 120, one or more user devices 140, and one or more other devices 150. In some embodiments, the environment 100 may be integrated in a retail store, market, or other commercial environment.

Terminals 105 generally include any structure that is capable of receiving input from customers and/or producing output to customers within the environment 100. The terminals 105 may include computing systems, portions of computing systems, or devices controllable by computing systems. In one example, a terminal may include a computing device that is communicatively coupled with a visual display and audio speaker(s), as well as being communicatively coupled with one or more input devices. In another example, a terminal may include a visual display and associated driver hardware, but a computing device coupled to the terminal and providing data for display is disposed separately from the terminal. In some embodiments, terminals 105 may be implemented as standalone devices, such as a kiosk disposed on the store floor or monolithic device disposed on a shelf or platform. In some embodiments, terminals 105 may be integrated partially or wholly with other components of the environment 100, such as input or output devices included with shelving or other structural components in the environment (e.g., components used for product display or storage). In some embodiments, terminals 105 may be modular and may be easily attachable and detachable to elements of the environment 100, such as the structural components.

Generally, terminals 105 may be distributed throughout the environment 100 and may enhance various phases of the shopping experience for customers. For example, terminals 105 may include digital signage 108 disposed throughout the environment, such as included in or near aisles, endcaps, displays, and/or shelving in the environment. A customer may view and/or interact with the digital signage 108 as he/she moves through the store environment. The digital signage 108 may be part of a static display or movable, such as digital signage included within a shopping cart or basket. Terminals 105 may also include POS terminals 106 that provide a checkout functionality, allowing the customer to complete his/her shopping transaction (e.g., make payment for selected items). In some embodiments, terminals 105 may provide an integrated functionality. For example, the terminals may function in one mode as digital signage, and when engaged by a customer, the terminals function as a POS terminal.

Servers $110_1$, $110_2$ generally include processors, memory, and communications capabilities, and may perform various computing tasks to support the commercial operation of the environment 100. Servers $110_1$, $110_2$ communicate using various wired and/or wireless communications methods with terminals 105, sensors 120, and with other networked devices such as user devices 140 and other devices 150. Servers $110_1$, $110_2$ generally execute computer program code in which input data is received from networked devices, the input data is processed and/or stored by the servers, and output data is provided to networked devices for operation of the environment 100.

Sensors 120 may include video sensors 125, audio sensors 130, and other sensors 135. The other sensors 135 generally include any sensor capable of providing meaningful information about customer interactions with the environment, e.g., location sensors, weight sensors, and so forth. Sensors 120 may be deployed throughout the environment 100 in fixed and/or movable locations. For example, sensors 120 may be mounted in walls, floors, ceilings, displays, or other devices or in shopping carts or baskets. In one embodiment, sensors 120 may include adjustable position sensor devices, such as motorized cameras attached to a rail, wire, or frame. In one embodiment, sensors 120 may be included on one or more unmanned vehicles, such as unmanned ground vehicles (UGVs) or unmanned aerial vehicles (UAVs or "drones"). Sensors 120 may also include devices in user devices 140 or other devices 150 (which in some cases may include body-worn or carried devices). User devices 140 and other devices 150 may include passive or actively-powered devices capable of communicating with at least one of the networked devices of environment 100. One example of a passive device is a near-field communication (NFC) tag. Active devices may include mobile computing devices, such as smartphones or tablets, or wearable devices such as a Google Glass™ interactive eyepiece (Glass is a trademark of Google Inc.). The user devices 140 generally denotes ownership or possession of the devices by customers, while the other devices 150 denotes ownership or possession by the retailer or other administrator of the environment 100. In some cases, other devices 150 may be carried by employees and used in the course of their employment. User devices 140 and other devices 150 may execute applications or other program code that generally enables various features provided by the servers and/or other networked computing devices.

Figure 2:
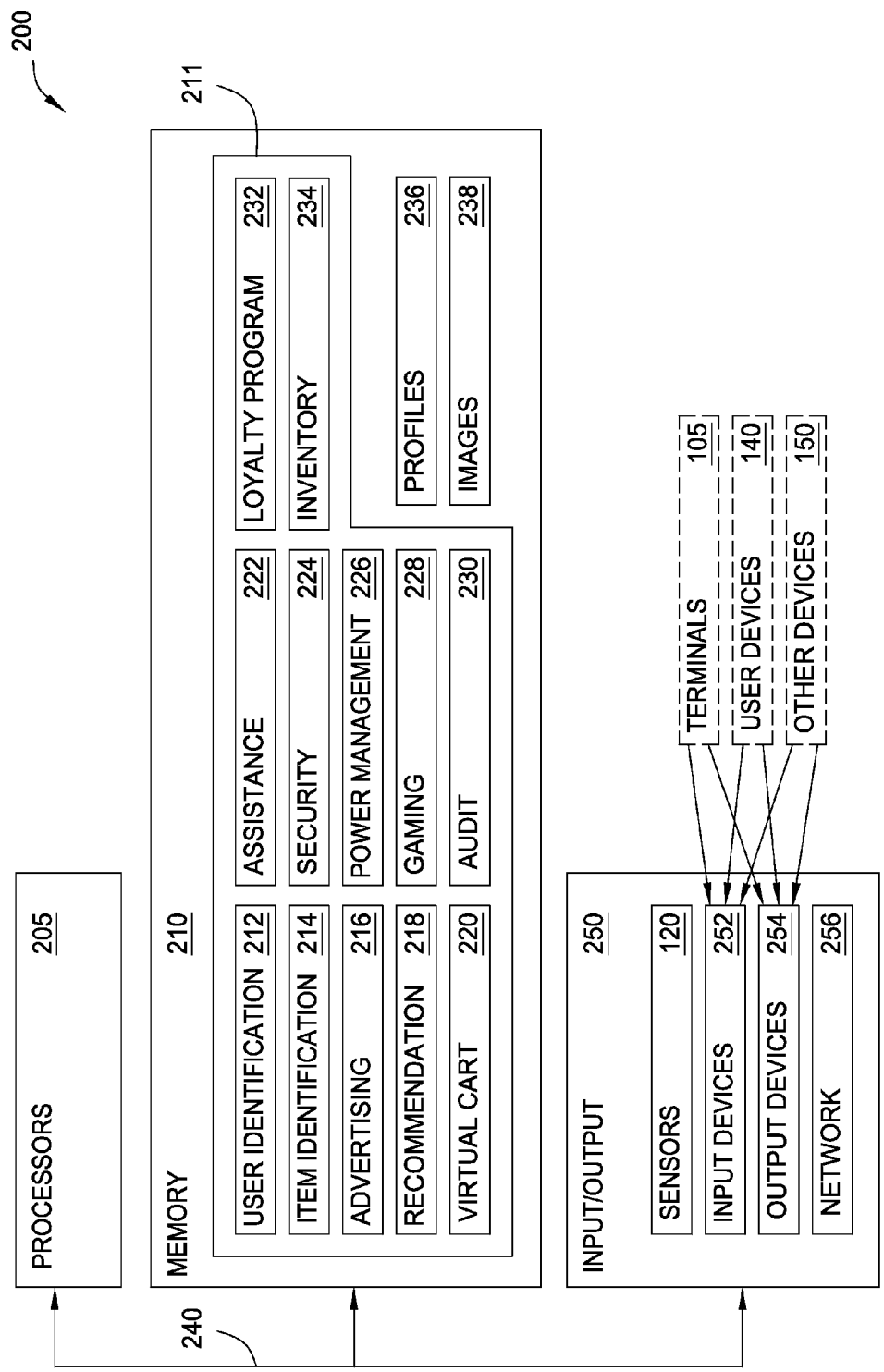
FIG. 2 illustrates an example shopping environment system, according to one embodiment.

FIG. 2 illustrates a shopping environment system, according to one embodiment. Generally, the system 200 corresponds to the environment 100 described above. System 200 includes one or more processors 205, memory 210, and input/output 250, which are interconnected using one or more connections 240. In one embodiment, system 200 may be included in a singular computing device, and the connection 240 may be a common bus. In other embodiments, system 200 is distributed and includes a plurality of discrete computing devices that are connected through wired or wireless networking. Processors 205 may include any processing element suitable for performing functions described herein, and may include single or multiple core processors, as well as combinations thereof. Processors 205 may be included in a single computing device, or may represent an aggregation of processing elements included across a number of networked devices such as user devices 140, POS terminals 105, etc.

Memory 210 may include a variety of computer-readable media selected for their size, relative performance, or other capabilities: volatile and/or non-volatile media, removable and/or non-removable media, etc. Memory 210 may include cache, random access memory (RAM), storage, etc. Storage included as part of memory 210 may typically provide a non-volatile memory for the networked computing devices (e.g., servers $110_1$, $110_2$), and may include one or more different storage elements such as Flash memory, a hard disk drive, a solid state drive, an optical storage device, and/or a magnetic storage device. Memory 210 may be included in a single computing device or may represent an aggregation of memory included in networked devices. Memory 210 may include a plurality of modules 211 for performing various functions described herein. The modules 211 store program code executable by one or more of the processors 205. As shown, modules 211 include user identification 212, item identification 214, advertising 216, recommendations 218, virtual cart 220, assistance 222, security 224, power management 226, gaming 228, audit 230, loyalty program 232, and inventory 234. The modules 211 may also interact to perform certain functions. For example, a module for a loyalty program 232 during operation may make calls to separate modules for user identification 212, item identification 214, advertising 216, and so forth. Persons of ordinary skill will recognize that the modules provided here are merely examples; different functions may be included as desired to suitably operate the shopping environment. Memory 210 may also include customer profiles 236 and customer images 238, which may be accessed and modified by the modules 211. In one embodiment, the customer profiles 236 and customer images 238 may be stored on the servers $110_1$, $110_2$ or on a separate database.

Input/output (I/O) 250 may include a number of different devices that are capable of interfacing with computing devices and/or with the greater shopping environment. I/O 250 includes sensors 120, described above. I/O 250 may include input devices 252 and output devices 254 included to enhance the shopping experience for customers. In one embodiment, terminals 105, user devices 140, and other devices 150 may include visual displays and/or audio speakers (examples of the output devices 254), and various input devices 252 (such as cameras, keyboards or keypads, touchscreens, buttons, inertial sensors, etc.). I/O 250 may further include wired or wireless connections to an external network 256 using I/O adapter circuitry. Network 256 may include one or more networks of various types, including a local area or local access network (LAN), a general wide area network (WAN), and/or a public network (e.g., the Internet). In one embodiment, various networked computing devices of the system 200 are interconnected using a LAN, and one or more computing devices (e.g., servers $110_1$, $110_2$, user devices 140) include connections to the Internet.

Figure 3:
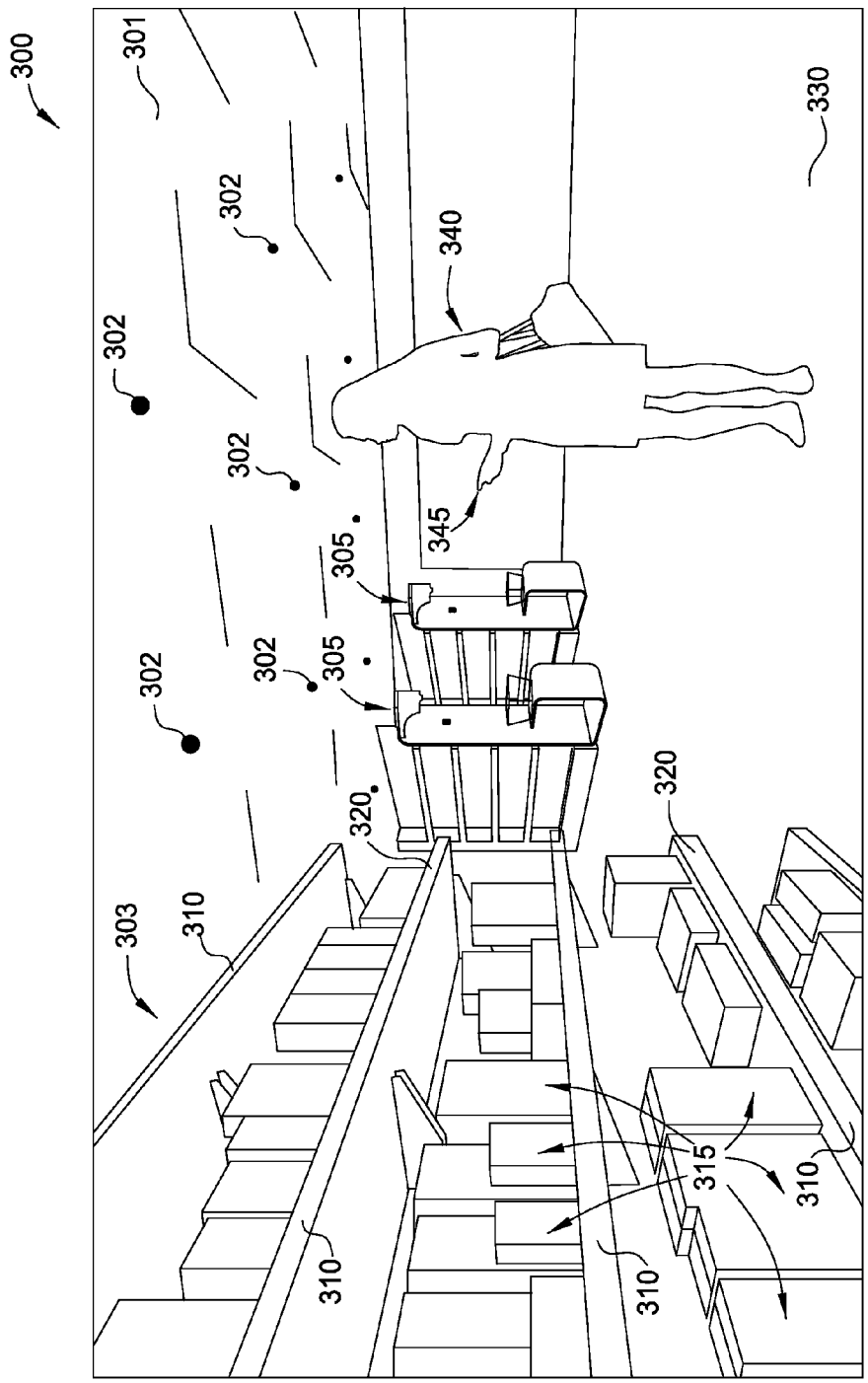
FIG. 3 illustrates an integrated shopping environment, according to one embodiment.

FIG. 3 illustrates an integrated shopping environment, according to one embodiment. The environment 300 includes a plurality of sensor modules 302 disposed in the ceiling 301 of the store. Each sensor module 302 may include one or more types of sensors, such as visual sensors (e.g., cameras), audio sensors (e.g., microphones), and so forth. Sensor modules 302 may also include actuating devices for providing a desired sensor orientation. Sensor modules or individual sensors may generally be disposed at any suitable location within the environment 300. Some non-limiting examples of alternative locations include below, within, or above the floor 330, within other structural components of the environment 300 such as a shelving unit 303 or walls, and so forth. In some embodiments, sensors may be disposed on, within, or near product display areas such as shelving unit 303. The sensors may also be oriented toward an expected location of a customer interaction with items, to provide better data about a customer's interaction, such as determining a customer's field of view.

Environment 300 also includes a number of kiosks (or terminals) 305. Generally, kiosks 305 allow customers to purchase items or perform other shopping-related tasks. Each kiosk 305 may include computing devices or portions of computing systems, and may include various I/O devices, such as visual displays, audio speakers, cameras, microphones, etc. for interacting with the customer. In some embodiments, a customer 340 may have a mobile computing device, such as a smartphone 345, that communicates with the kiosk 305 to complete a purchase transaction. In one embodiment, the mobile computing device may execute a store application that is connected to the networked computing systems (e.g., through servers $110_1$, $110_2$), or may be directly connected to kiosk 305 through wireless networks accessible within the environment (e.g., over Wi-Fi or Bluetooth). In one embodiment, the mobile computing device may communicate with the kiosk 305 when brought within range, e.g., using Bluetooth or NFC.

Environment 300 also includes shelving units 303 with shelves 310 and items 315 that are available for selection, purchase, etc. Multiple shelving units 303 may be disposed in a particular arrangement in the environment 300 to form aisles through which customers may navigate. In some embodiments, the shelving unit 303 may include attached and/or embedded visual sensors or other sensor devices or I/O devices. The sensors or devices may communicate with a customer's smartphone 345 or other networked computing devices within the environment 300. For example, the front portions 320 of shelves 310 may include video sensors oriented outward from the shelving unit 303 to capture customer interactions with items 315 on the shelving unit 305, and the data from the video sensors may be provided to back-end servers for storage and/or analysis. In some embodiments, portions of the shelving unit 303 (such as the front portions 320 of shelves 310) may include indicator lights or other visual display devices or audio output devices that are used to communicate with a customer.

Figure 4:
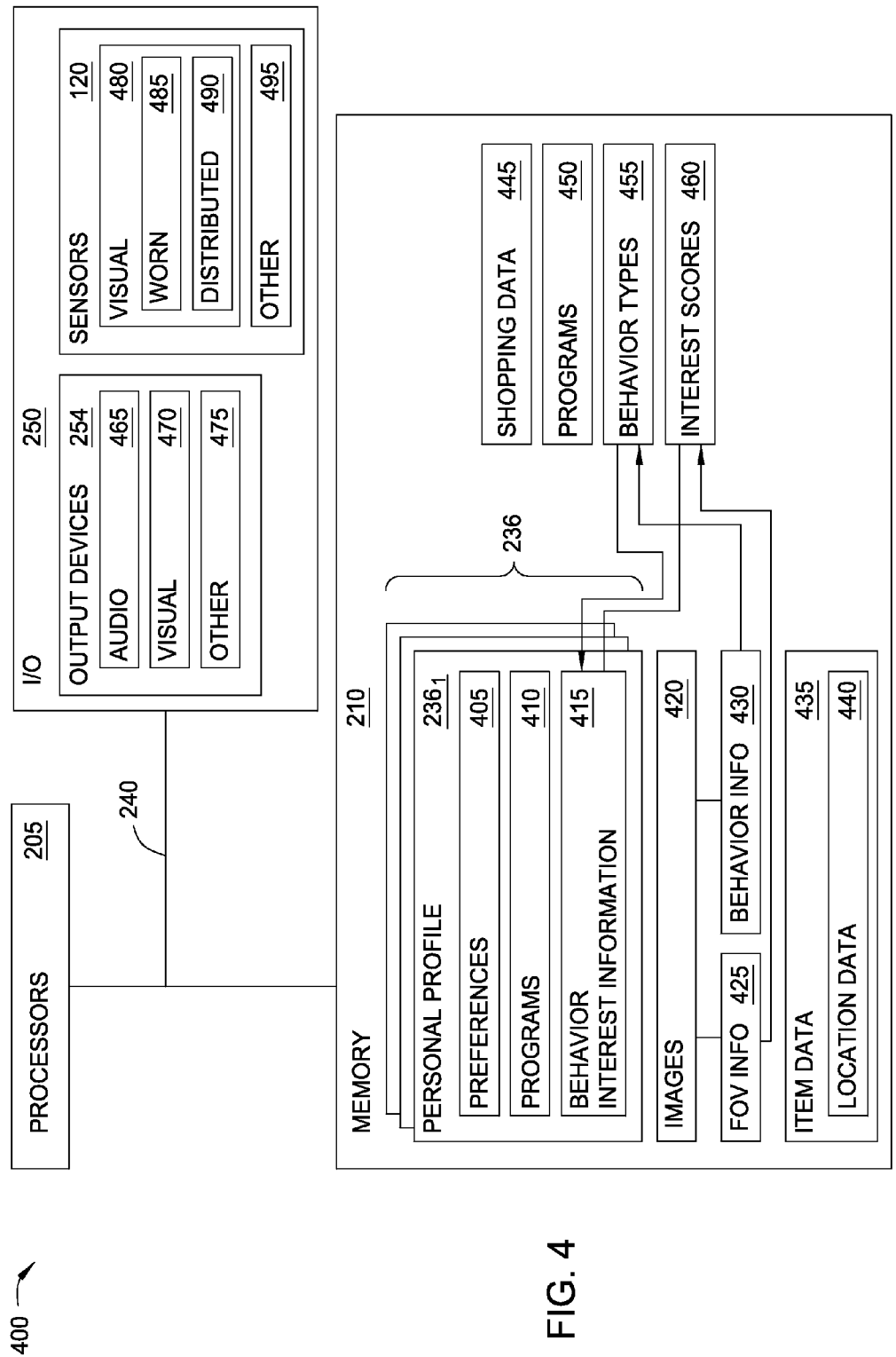
FIG. 4 illustrates a system of influencing experience based on determined field of view information for a person, according to one embodiment.

FIG. 4 illustrates a system capable of influencing a person based on determined field of view information for the person, according to one embodiment. System 400 may be used in coordination with the various environments described herein. Generally, system 400 may share at least portions of several components with the environment system 200, such as processors 205, memory 210, and I/O 250. System 400 may also include some of the modules 211 to provide various aspects of the system's functionality, such as item identification 214, advertising 216, recommendation 218, and so on.

I/O 250 includes one or more output devices 254 and one or more sensors 120. Output devices 254 include one or more devices for presenting information to customers and generally include audio output devices 465 and/or visual output devices 470. The audio output devices 465 may include conventional audio speakers having any suitable form factor (e.g., standalone, integrated in a stereo, headphones, etc.), as well as devices using alternative methods of producing sound to a customer, such as bone conduction transducers in a worn device. Visual output devices 470 may include visual displays and various visual indicators such as light emitting diodes (LEDs). Other output devices 475 may provide information to customers through tactile feedback (e.g., haptic devices) or other sensory stimuli. Sensors 120 may include visual sensors 480 which may be carried or worn sensors 485, and distributed sensors 490 that are disposed throughout the environment. In one embodiment, the distributed sensors 490 are fixedly disposed at environment locations. In one embodiment, at least some of the distributed sensors 490 are movable. For example, the distributed sensors 490 may be included on movable product displays or structures, and/or unmanned vehicles (e.g., aerial or ground-based vehicles). Other sensors 495 may also be included that are suitable for collecting information about a person and his/her interactions within the environment. Examples of other sensors 495 include without limitation infrared (IR) sensors, thermal sensors, weight sensors, capacitive sensors, magnetic sensors, sonar sensors, radar sensors, lidar sensors, and so forth.

The visual sensors 480 may capture images 420 of the person and/or the environment, which may include views from various perspectives (e.g., a customer-worn visual sensor, static or movable visual sensors at various locations in the environment). The images 420 may be stored in memory 210, and may be individually or collectively processed to determine information about customers in the environment and their respective interactions with items in the environment.

Memory 210 includes programs 450 that receive data about the environment and person(s) within the environment, process the received data, and transmit information to certain person(s) in order to influence their decision-making processes. Programs 450 may determine field of view information 425 for a person at a given time, i.e., determine items the person can see at a given time. For example, a body-worn device may include a visual sensor (i.e., a worn visual sensor 485) that, when the device is worn, gives the visual sensor an orientation that is similar to the orientation of the person's head or eyes (e.g., a forward-looking camera). The images 420 that are captured from the worn visual sensor 485 may be representative of the person's field of view.

In some embodiments, the person's field of view may be estimated using other sensor measurements. In one embodiment, the person's field of view may be estimated by determining the orientation of one or both of the person's eyes. Eye orientation may be determined using worn visual sensors 485 (e.g., an inward-facing camera on a head-worn device) and/or distributed visual sensors 490 (e.g., capturing images of the person's face and image processing to determine an eye orientation). In other embodiments, the person's field of view may be estimated by determining the position and/or orientation of the person's head and/or body using various visual sensor measurements. The person's field of view may be represented in any suitable data format, such as an image or as coordinate data (e.g., Cartesian, polar, spherical coordinates).

While a single visual sensor 480 may be used to determine a customer's field of view, a combination of visual sensors 480 can be used to determine a field of view as well. The latter may be preferred as providing additional data to support a more accurate estimate of the field of view. Additionally, the visual sensors 480 used to determine a person's field of view may include visual sensors selected from different categories (worn sensors 485, distributed sensors 490) to provide additional robustness to the collected data.

Programs 450 may also identify items included within the person's field of view. The identification process may be performed directly or estimated. One example of direct identification is performing image processing on images collected from a worn, forward-looking camera to visually identify one or more items. Estimating the items within a person's field of view may require combining sensor data with known information about the shopping environment, such as the items that are included in the environment (item data 435) and their relative arrangement or layout within the environment (location data 440), such as may be included in a planogram for the environment.

Programs 450 may also present information to persons based on the identified one or more items. In some embodiments, the information may be used to influence the person's decision-making during a shopping experience. The information presented to the person may include information about the identified items (e.g., nutritional data, pricing, a personal purchase history for the items, etc.), information encouraging the purchase of identified items (e.g., bringing particular items to the person's attention, touting the items' features, offering discounts or other promotions on the items, etc.), and information encouraging the purchase of alternatives to the identified items (e.g., highlighting differences of the items, offering discounts, etc.).

To present relevant and influential information in real-time to a particular person, programs 450 may analyze data in memory 210 related to the person and perhaps other persons within the shopping environment. In one embodiment, programs 450 may analyze shopping data 445 collected from previous experiences for the particular person and/or for other persons or groups of persons. For example, shopping data 445 may include a number of customer views and the items included therein, progressions of customer views (reflecting a customer's interest over time), selection or purchase history for items, and so forth. While shopping data 445 may be compiled and used to generate information to present to customers and influence their shopping experiences in real-time, the shopping data 445 may also be used by the retailer or other administrator of the environment to optimize the layout of the environment. The shopping data 445 may help the retailer identify trends in customer shopping, and to optimize placement of items within the environment to improve customer sales and/or improve security.

System 400 may also present information to customers based on their personal preferences 405. The preferences 405 may generally be stored in a corresponding personal profile 236 and reflect preferences explicitly specified by a customer or determined based on the customer's historical shopping behavior (e.g., included in or generated based on shopping data 445). For example, a customer may have an allergy to a particular ingredient, and the customer may enter this allergy information in preferences 405, e.g., using a mobile phone app for the retailer. Accordingly, the system 400 when determining which information to present to the customer may present information that highlights items within the customer's field of view that include the ingredient, and may further suggest alternative items that do not include the ingredient.

A customer's shopping history may also be used to determine customer preferences 405. For example, the customer's determined fields of view and purchase history from shopping data 430 may be processed to deduce which items, combinations of items, and/or aspects of items are preferred by the customer. For example, preferred aspects might include preferred brands, costs, quantities, sizes, ingredients, nutritional properties (e.g., calorie content, fat, sugar, vitamins, minerals, etc.), and so forth. For example, the customer may specify a preference for low-fat foods, and the system may determine recommended items based on the items included in the customer's field of view and the customer's preferences. This may include suggesting a particular item within the field of view for purchase (or alternatively, an item located outside the field of view) and/or advising the customer about the item's properties vis-à-vis the customer's preferences (e.g., reporting fat content).

Of course, a customer's preferences may be included as a logical combination of a plurality of these aspects (e.g., a customer prefers Brand X items to Brand Y, so long as the cost of the Brand X item is no more than 150% of the Brand Y item). In some embodiments, other customers' shopping data may also be used to deduce a particular customer's preferences. Of course, the preferences may be dynamically updated to identify whether deduced preferences are accurate or not. The dynamic updating may be caused by the customer's explicit indication and/or by the customer's shopping patterns following the deduced preference. For example, the system 400 may deduce that a customer has a categorical preference for Brand X items over similar Brand Y items. However, the customer's historical shopping data indicated that the customer looked at a Brand X item (e.g., field of view data) before selecting and purchasing a similar Brand Y item (e.g., field of view data and/or purchase history data). The system in response may adapt or may entirely remove the deduced (and determined inaccurate) preference.

In some embodiments, system 400 may present information to customers based on other programs 410. Examples of programs 410 may include fitness, nutrition, or health goals, money management goals, etc. In some embodiments, the programs 410 themselves may be integrated as features within a store application and accessible by the customer's mobile computing device or wearable device. In other embodiments, the store application may interface with applications from other providers to determine the customer's goals and present appropriate information during the shopping experience. For example, the system 400 could include a nutrition-oriented program, and may make suggestions for more nutritious items to a customer who is looking at junk food items (e.g., candy).

The system 400 may also determine behavior information 430 for the person, and the behavior information then used to determine the person's level of interest in certain items, to correlate particular behaviors of the person with their interest levels, and so forth. Generally, the behavior information reflects the person's interaction (or lack of interaction) with particular items. The interaction may be determined using a number of images 420 (e.g., using visual sensors 470, 480), as well as various other data provided by sensors 120. In some embodiments, field of view information 425 is determined for the person, and associated with the behavior information 430 to determine interest levels or correlations. The association of field of view information 425 and behavior information 430 may thus help determine what items and/or factors influence a person's behavior. The field of view information may be used to provide real-time suggestions or recommendations to the person and/or provided to an administrator of the environment (e.g., a retailer) to improve the layout of items within the environment. Capturing field of view information 425 is discussed more fully in FIGS. 6A-6C, below.

In some embodiments, behavior information 430 may be classified into a number of predetermined behavior types 455. The behavior types may reflect a common set of personal behaviors that are selected as tending to suggest whether the person is interested or uninterested in certain items. The behavior types may reflect the person's viewing of the items (including any emotional reactions to the items) and/or manual manipulation of the items. In some embodiments, the behavior types include a time element, e.g., performing a particular behavior within a certain time or for a predetermined length of time. Some non-limiting examples of behavior types include handling an item, reading a label or other printed information on the item, selecting the item for purchase (e.g., placing into a cart or walking away from the shelf location with the item), returning the item to the shelf, and declining to approach an area including the item (e.g., walking past an aisle). In some cases, emotional reactions may be determined using image information that includes the person's face, hands, etc. Emotional reactions may include facial expressions having cultural-specific meanings, such as raising eyebrows, opening or shutting eyelids, shaking the head in particular directions, sticking out the tongue, and so forth. More detailed examples of behaviors are provided below with respect to FIGS. 7A, 7B, and 8.

The behavior information 430, when classified into one or more behavior types 455, may be used to determine the person's interest in certain items, such as those included within the person's field of view. System 400 may generate interest scores 460 corresponding to specific items or groupings of items based on the determined level of interest of the person. In one embodiment, a numerical interest score is generated for items. In one embodiment, the interest score 460 includes a sum (or weighted sum) of sub-scores calculated relative to one or more behaviors taken by the person with respect to the item. In one embodiment, the interest score for a particular item is modified based on further behaviors of the person with the item or other items (e.g., updated correlations such as behavior-interest information 415 or based on scoring relationships determined between items). In one embodiment, the interest scores are classified according to one or more levels of scoring, such as high interest, medium, low, and no interest.

The personal profiles 236 may include behavior-interest information 415 generally used to correlate behaviors of the person to interest scores (or levels of scores). In one embodiment, the behavior-interest information 415 may be a simple numerical value or coefficient. For example, the coefficient may represent a weight value for the particular behavior for the particular person. In one embodiment, a numerical value related to the behavior (e.g., based on a determined length of time interacting with the item) is multiplied with the behavior-interest information 415 to generated an interest score 460. In one embodiment, the behavior-interest information 415 is adaptively updated for the person as he/she has further interactions with items and additional behavior information is acquired and assessed.

In one embodiment, the behavior-interest information 415 included in one personal profile $236_1$ may also reflect the interactions of other persons in the environment. For example, the behavior-interest information 415 may be adaptively updated based on the corresponding behavior-interest information included in other of the personal profiles 236. In one embodiment, the other personal profiles may be selected based on an assessed similarity with shopping data 445 or with personal profile $236_1$, such as similarity with preferences 405, programs 410, etc. In one embodiment, values of the behavior-interest information 415 may be initially set for a person based on an aggregation of behavior-interest information from a number of different personal profiles (such as calculated average values corresponding to each of the different behavior types 455). The values of the behavior-interest information 415 may be subsequently updated based on the personal interactions and behaviors of the person, as the system 400 better "learns" the habits and behaviors of the individual person.

Figure 5A:
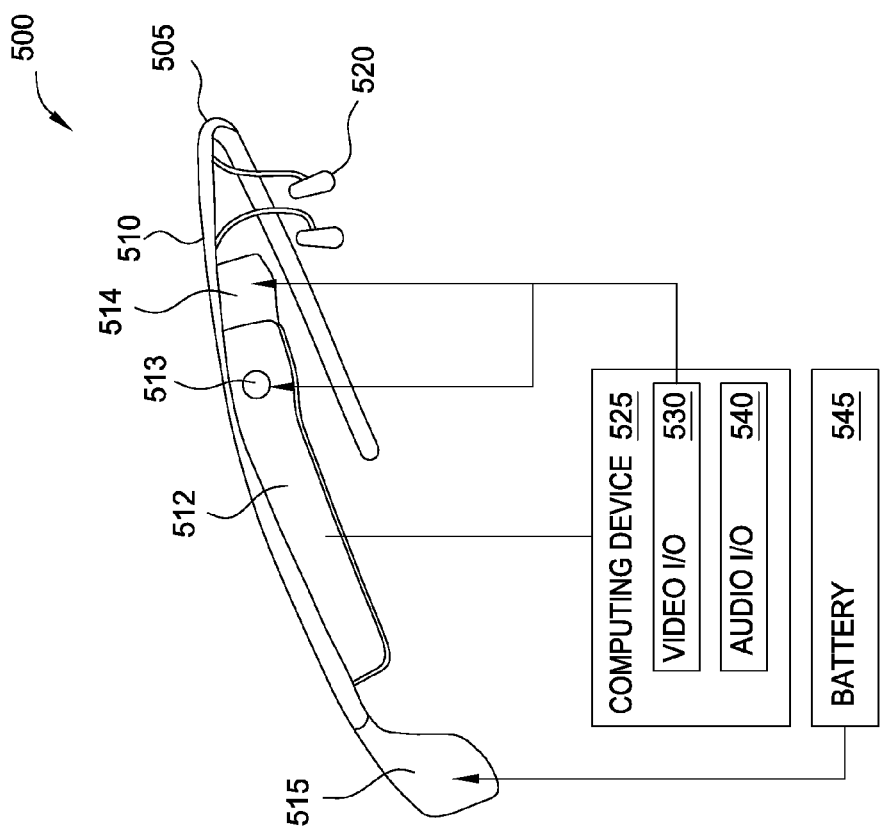
FIGS. 5A and 5B illustrate an example wearable computing device for use in a shopping environment, according to one embodiment.
Figure 5B:
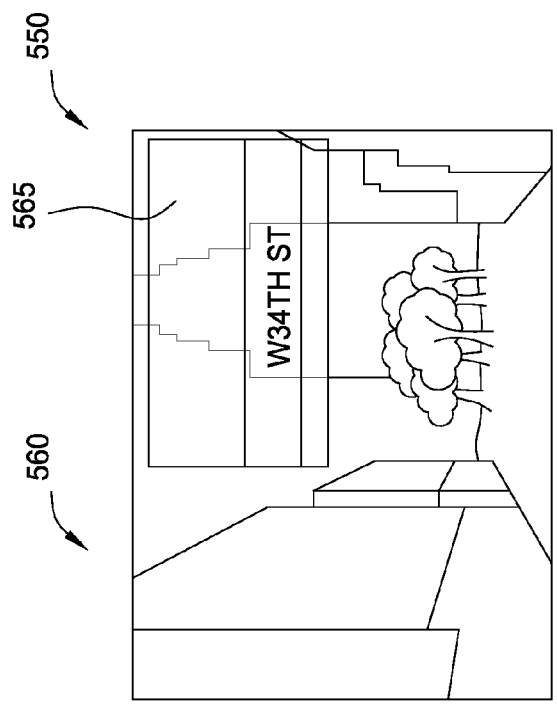

FIGS. 5A and 5B illustrate an example wearable computing device for use in a shopping environment, according to one embodiment. Portions of wearable computing device 500 may be head-worn or worn on other portions of the body. The wearable computing device 500 includes a housing 505 that includes several structural components. The band 505 may be used as a structural frame, supporting other portions while itself being supported by a customer's head when worn. Other structural components may include nose pieces 520, ear piece 515, and enclosure 512. Enclosure 512 may include a computing device 525, which includes video I/O components 530 and audio I/O components 540. The enclosure formed by the earpiece 515 may also house components, such as a battery 545 for powering the computing device 525. Although not shown, computing device 525 also includes wireless networking components for communicating with other computing devices. The video I/O components 530 may include a forward-looking camera 513 that provides an estimate of the wearer's field of view based on their head orientation, and a transparent prism 514 that is used to project light onto the wearer's retina, displaying information to the wearer over the wearer's natural field of view. Other video I/O components may include an inward-looking camera that is configured to capture the eye orientation of the wearer, a conventional display device (e.g., a LCD), and so forth. Audio I/O components 540 may include one or more microphones and/or audio output devices, such as speakers or bone-conducting transducers.

FIG. 5B illustrates a view seen by a person wearing the wearable computing device 500. As shown, scene 550 includes the wearer's natural view 560. A portion of the area of the natural view 560 may be used for displaying an overlay 565 (e.g., using the prism 514) that provides additional information to the wearer. The display of the overlay 565 may be adequately transparent to permit the wearer to continue to observe their natural view through the overlay area. As shown, the overlay 565 includes a map view of the wearer's current location (e.g., the wearer is at W $34^{th}$ Street). In some embodiments, information may be selected and visually presented in text and/or graphics to a customer wearing such a device to influence decisions made during his or her shopping experience.

Figure 6B:
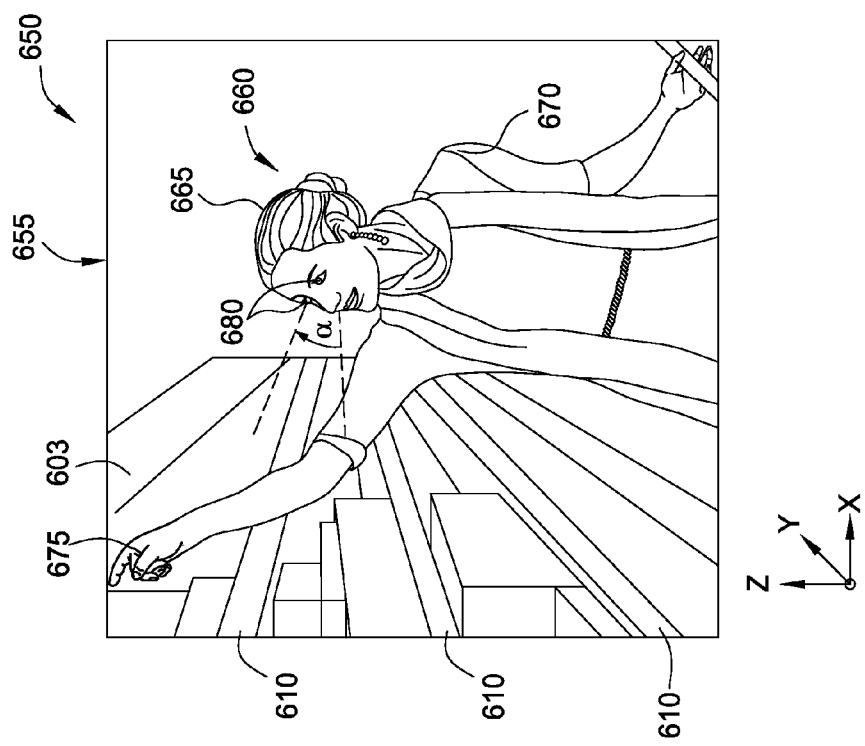
FIGS. 6A-6C illustrate determining field of view information for a person and identifying items included within a determined field of view, according to one embodiment.
Figure 6A:
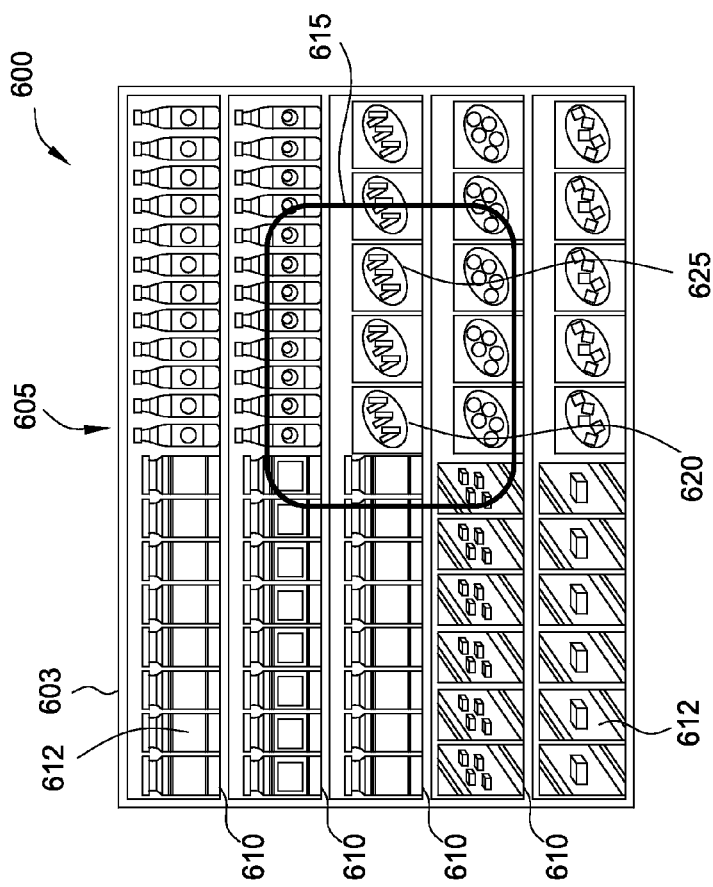
Figure 6C:
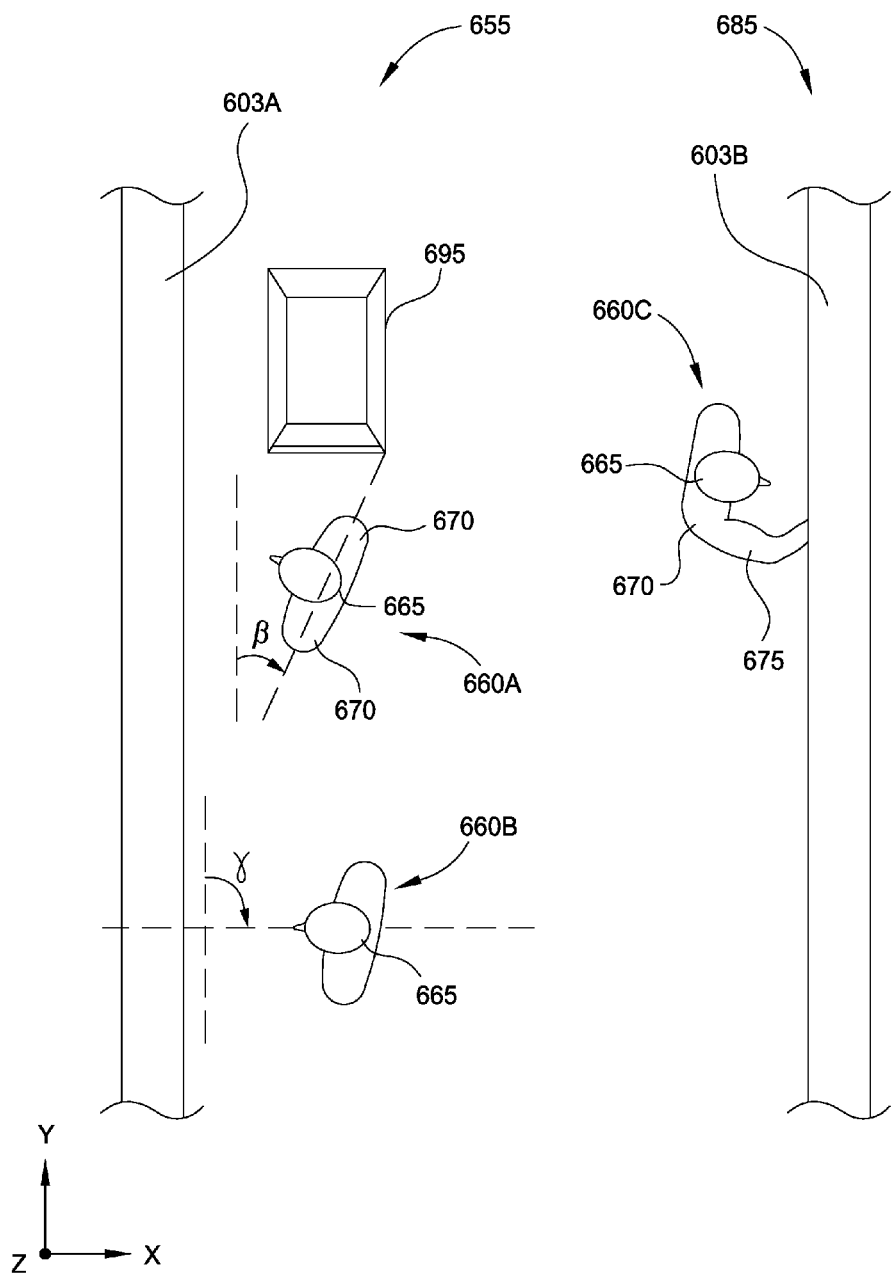

FIGS. 6A-6C illustrate determining field of view information for a person and identifying items included within a determined field of view, according to one embodiment. In scene 600, a shelving unit 603 is depicted having a plurality of shelves 610 that each support and display a number of items 612 that are available for selection and purchase by a person or customer.

Within the scene 600 are defined a customer's field of view 615 and an area 605 outside the customer field of view. In one embodiment, the customer's field of view 615 may be represented by an image captured from a forward-looking camera. While shown as generally rectangular, the customer field of view 615 may have any suitable alternative shape and size. For example, the customer's actual vision may encompass a significantly larger area, but determining the field of view for purposes of the shopping environment may include applying a threshold or weighting scheme that emphasizes areas that are closer to the center of a customer's vision. Of course, data provided by various visual sensors and/or other sensors within the environment may be used to make these determinations.

The field of view 615 may include a plurality of fully included items 620, as well as a plurality of partially included items 625. When determining which items to identify as "included" in the field of view, certain embodiments may categorically include or exclude the partially included items 625. An alternative embodiment may rely on image processing to determine whether a partially included item 625 should be identified as included. For example, if the processing cannot recognize the particular item with a certain degree of confidence, the item may be excluded. In another alternative embodiment, partially included items 625 may be included, and the amount of item inclusion (e.g., the percentage of surface area of the item included) may be used to determine a customer focus or calculate a customer interest score, which are discussed further below.

Items within the customer field of view 615 may be recognized by performing image processing techniques on images captured by various visual sensors. For example, images that include the items may be compared against stock item images stored in a database or server. To aid image processing, items may also include markers or distinctive symbols, some of which may include encoded item identification data such as barcodes or quick response (QR) codes. Of course, other processing techniques may be employed to recognize a particular item, such as textual recognition, determining the item's similarity to adjacent items, and so forth.

Scene 650 of FIG. 6B depicts a customer 660 in a shopping environment. The customer 660 is standing in an aisle 655 adjacent to a shelving unit 603, which has a plurality of shelves 610. Visual sensors may capture one or more images of scene 650 from various spatial perspectives, and the images may be used to determine the customer's field of view. Specifically, various aspects of the scene that are captured in the images may be used to estimate the customer's field of view.

In one embodiment, the relative position and/or orientation of portions of the customer's body may be determined. In one embodiment, the position and orientation of the customer's eyes 680 may be determined. For example, eye position within the environment may be determined in Cartesian coordinates (i.e., determining x, y, and z-direction values) and eye orientation may be represented by an angle α defined relative to a reference direction or plane (such as horizontal or an x-y plane corresponding to a particular value of z). In other embodiments, other portions of the customer's body may (also) be used to determine the field of view, such as the position and orientation of the customer's head 665, or of one or both shoulders 670. In other embodiments, the customer's interaction with the shelving unit 603 by extending her arm 675 may also be captured in one or more images, and the direction of the extended arm may be used to determine her field of view.

Of course, some embodiments may use combinations of various aspects of the scene to determine the customer's field of view. In some embodiments, the combinations may be weighted; for example, data showing a customer 660 reaching out her arm 675 towards a specific item may be weighted more heavily to determine her field of view than the orientation of her shoulders. In some embodiments, the weights may be dynamically updated based on the customer's shopping behaviors following an estimate of the customer's field of view. For example, if a customer reached for (or selected) an item that was not included in the determined field of view, the system may adjust the relative weighting in order to accurately capture the customer's field of view. This adjustment may include determining correlation values between particular captured aspects of the scene to the selected item; for example, the customer's head may be partly turned towards the selected item, but their eye orientation may generally be more closely tied to the selected item. In some embodiments, the correlation values may be more useful where one or more aspects of the scene cannot be determined (e.g., the system may be unable to determine eye orientation for a customer wearing sunglasses, non-optimal visual sensor positioning, etc.).

Scene 685 of FIG. 6C illustrates an overhead view of several customers 660 in a shopping environment. In one embodiment, the view of scene 685 may be represented by an image captured from a ceiling-mounted camera, or from a aerial drone.

Certain additional aspects depicted in scene 685 and captured in images may be used to estimate a customer's field of view. In one example, the orientation of customer 660A may be estimated using the relative position of his/her shoulders 670. As shown, a line connecting the two shoulders may be compared to a reference direction or plane (e.g., parallel to the length of shelving unit 603A) and represented by an angle β. In another example, the orientation of customer 660B may be estimated using the orientation of his/her head 665, comparing a direction of the customer's head to a reference direction or plane, which may be represented by an angle γ. Images may also capture a customer 660C interacting with the shelving unit 603B, and the position and/or orientation of the customer's arm 675 may be used to determine the customer's field of view.

Figure 7A:
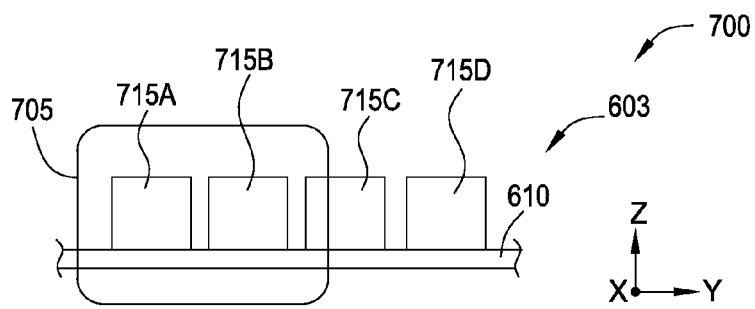
FIGS. 7A and 7B illustrate views of several exemplary predefined behavior types, according to one embodiment.
Figure 7B:
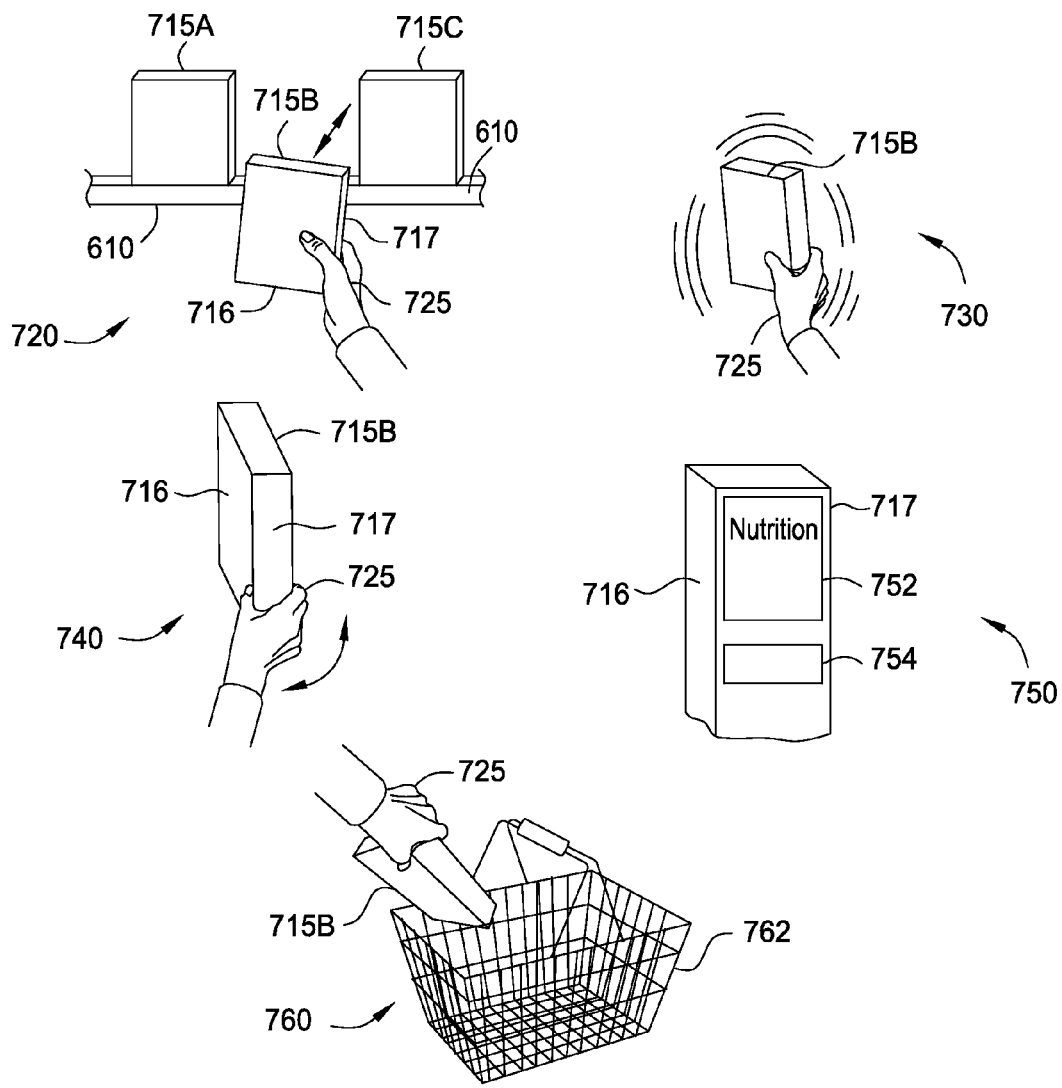

FIGS. 7A and 7B illustrate views of several exemplary predefined behavior types, according to one embodiment. While the computing systems may determine information such as behavior information 430 and/or interest scores 460 based on all of the items identified within a determined field of view, in some embodiments it may be advantageous to make a further identification of one or more items that the person or customer is specifically focused on. Relating information more closely to person-focused items may generally improve the accuracy of assessing a person's interest in certain items, and ultimately providing more relevant and therefore more persuasive information to influence the customer's shopping experience. In one embodiment, a person's focus on certain items within a field of view may be included as one of the predefined behavior types 455, and may influence the interest scores 460 for those person-focused items.

In scene 700 depicted in FIG. 7A, items 715A-D are included on a shelf 610 of a shelving unit 603. The determined field of view 705 of a customer may include different groups of items at different times, and the progression of the customer's field of view over time may help determine which item(s) within the field of view are specifically being focused on by the customer. Generally, the customer's focus on a particular item may indicate that the item is merely attracting the customer's attention, or that the customer is deciding whether or not to purchase the item. Either way, understanding the object of a customer's focus may help retailers or suppliers to improve packaging and placement of items or to influence the customer's shopping experience in real-time.

The determined field of view 705 includes items 715A, 715B, and a portion of 715C. In one embodiment, items 715A and 715B may be included in a customer focus determination due to the items' full inclusion within the field of view 705. Conversely, item 715C may be excluded from a customer focus for being only partially included in the field of view 705. In an alternative embodiment, all three items may be included by virtue of being at least partially included in the field of view 705. In some embodiments, a customer focus on particular items may be a time-based determination. For example, if the customer's field of view 705 remained relatively steady during a preset amount of time (e.g., 5 or 10 seconds), such that both items 715A, 715B remained within the field of view during this time, the computing system may determine that the customer is focused on items 715A, 715B. In some embodiments, the particular item(s) must continuously remain in the field of view 705 during the preset amount of time (e.g., remain across several samples of the field of view during this time).

In some embodiments, the length of time that items are included in the field of view 705 may affect the classification of the behavior type, and/or may affect a numerical value related to the classified behavior type. For example, a first example predetermined behavior type may be "Viewed item between 0-5 seconds" and a second example type may be "Viewed item more than 5 seconds." Of course, the determined length of time will be used to classify the person's behavior into one of the example behavior types. However, one or more values may also be associated with the behavior type, such as the amount of time. In this case, a person viewing an item for 8 seconds, while classified under the second example behavior type, may correspond with a larger value for the behavior type than if the person viewed the item for only 6 seconds. The classified behavior type, as well as the associated value may be used when determining the person's interest in the item. For example, viewing the item for 8 seconds may result in a larger interest score for the item than viewing the item for 6 seconds.

FIG. 7B illustrates several other example behaviors, which may be included as classes of predefined behavior types. Scene 720 illustrates a person using their hand 725 to remove an item 715B from a shelf 610, as might be commonly performed for selecting an item for purchase. The item 715B may include a number of distinct portions, such as a front portion 716 and a side portion 717, whose relative orientation may be used to determine a person's manipulation of the item (e.g., using visual sensors). Generally, removing the item from the shelf indicates an increased interest in the item, and may precede other behaviors, such as manipulation of the item. Another example behavior may be returning the item 715B to the shelf 610, which may generally tend to show a decreased interest in the item. Of course, the associations of different behaviors with increases or decreases of interest are merely generalities, and could very well differ in individual cases.

Another example behavior is depicted in scene 730, which illustrates a person shaking the item 715B using their hand 725. The example behavior depicted in scene 740 is the rotation of the item 715B. While rotation from a view of predominantly the front portion 716 to the side portion 717 is shown, other spatial manipulations are possible. Rotation of the item may generally tend to show an increased interest in the item—for example, the person viewed the item's packaging and would like to know more about it. Of course, a subsequent rotation back to a previous orientation may generally indicate a decrease in interest; a repeated back-and-forth rotation, however, may generally indicate increased interest.

Scene 750 depicts a reading of the item, such as label portions 752 (i.e., nutrition information), 754 located on the side portion 717. Reading the label portions may generally indicate an increased interest in the item. Alternatively, scene 750 may depict the person taking a closer inspection of a portion of the item, indicated by the relative spatial increase of side portion 717 in the person's field of view or the decreased distance of the item to the person's eyes, etc.

Scene 760 depicts placing the item 715B into a shopping basket 762 or other receptacle (such as a shopping cart), which tends to show increased interest in the item as the person has selected the item and is more likely to complete the purchase of the item. Of course, in some cases the person may not use a receptacle but instead carries the item away from its original location on the shelf. The carrying away of the item also may show an increased interest in the item.

Figure 8:
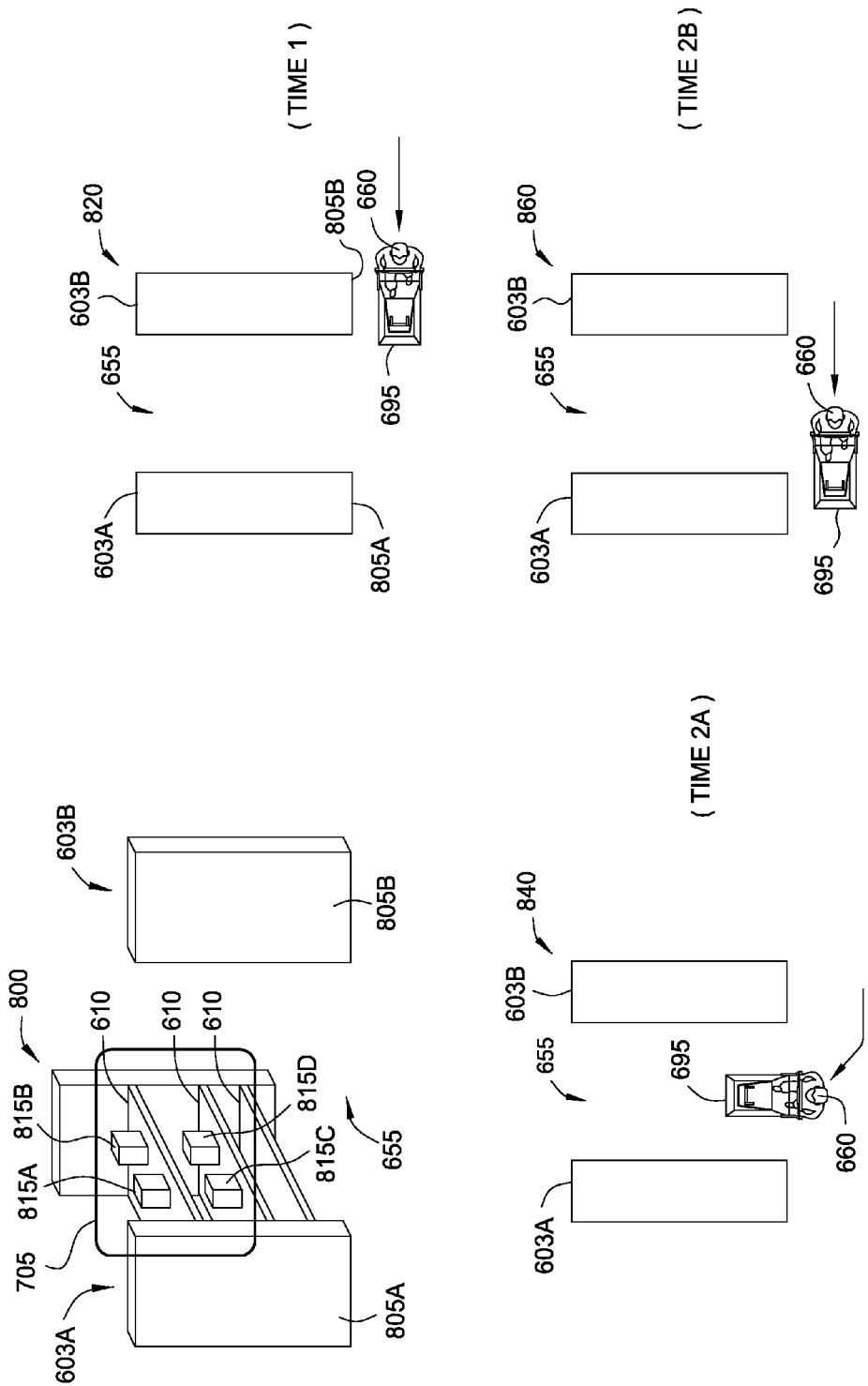
FIG. 8 illustrates views of several exemplary predefined behavior types, according to one embodiment.

FIG. 8 depicts other example behaviors, which may be included as classes of predefined behavior types. Scene 800 illustrates an example view of a customer as they move through a shopping environment, such as past one or more endcaps 805A, 805B of shelving units 603A, 603B. A determined field of view 705 for the customer includes one or more items 815A-D located on one or more shelves 610 of shelving unit 603A. The space separating adjacent shelving units 603 is aisle 655, which the customer may choose to enter or decline to enter. The decision whether to enter aisle 655 may be based on the viewed items 815A-D and may depend on whether the customer wishes to view additional items located on the shelving units 603A, 603B. View 820 illustrates a top view of the scene 800, such as might be captured in an image by an overhead visual sensor. The customer 660 is depicted as pushing a shopping cart 695. View 820 corresponds to a first time (Time 1) during which the customer may be deciding whether to enter the aisle 655. View 840 represents a view at a subsequent second time (Time 2A) and in which the customer 660 has chosen to enter the aisle 655. View 860 corresponds to an alternative second time (Time 2B) and in which the person 660 has declined to enter the aisle 655. As with the various other example behavior types, the items 815A-D identified within the person's field of view 705 at Time 1 may be associated with the behavior of entering or declining to enter the aisle 655. This information may be used to alter the customer's interest scores for the items 815A-D, as well as provide feedback to the retailer regarding store layout, item showcasing, etc.

In some embodiments, the interest scores for items may be updated in real time to provide a more responsive and interactive experience for the person. In some embodiments, the interest scores may be calculated using a decay function or other time-based functions, such that the calculated interest score for an item will change due simply to the passage of time. For example, even if the person views the item and thereby increases the interest score, if the person continues to view the item without taking any other action, the increased interest score may subsequently decrease. In one embodiment, a decay function is applied to the interest scores after a predetermined amount of time. In another embodiment, the function may have increasing portions as well as decreasing portions. For example, viewing an item may increase the interest score in the item during a predetermined time, such as 20 seconds, and then decrease the interest score. In another embodiment, the behaviors of the person or of one or more different people (e.g., reflected in personal profiles 236) may be used to determine and/or adaptively update properties of the time-based functions. For example, the item viewing behaviors for multiple people may be assessed and an average time determined correlating to a peak in interest scores. The time-based functions may be altered according to the determination, such that a function for viewing an item increases the interest score until the determined average time, and subsequently decreases the interest score after that time. Of course, other suitable adaptations of the algorithm may be made.

The increase or decrease of interest scores for items may be used to trigger interventions by the system, such as causing the system to generate and display suggestions or present other information to the person. In one embodiment, a change in the interest scores may cause a change to the interest level, and the current level or the mere change in level may trigger an intervention. For example, a person's interest score may decrease from a "medium interest" level to "low interest" based on their behavior information or over time, and the system may intervene in order to influence their experience. The interventions may be selected to reinvigorate interest in the particular item (having the decreased interest score), or may be selected to exploit the decreased interest by suggesting an alternative item. The decrease in interest score also could reflect indecision on the person's part, and the interventions may be used to aid the person to determine whether to purchase the item.

Figure 9A:
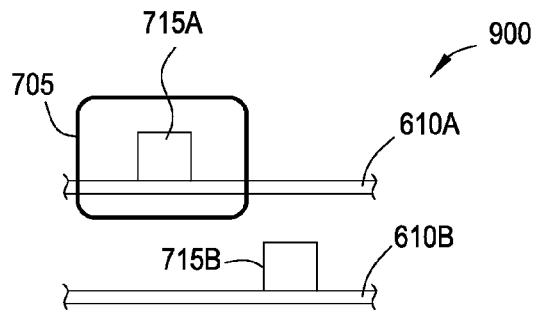
FIGS. 9A-9C illustrate several example presentations of information related to an item, according to one embodiment.
Figure 9B:
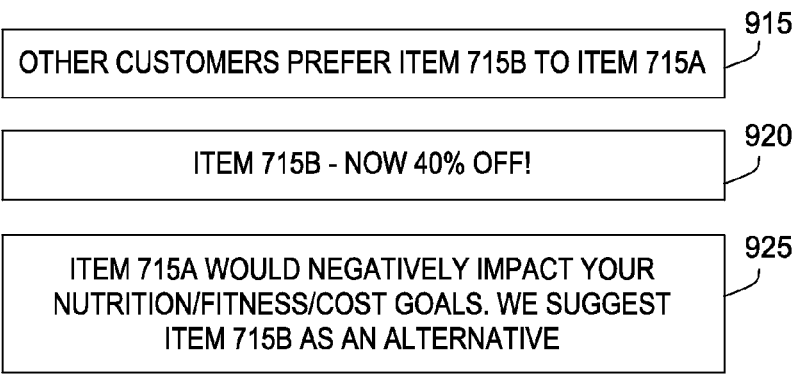
Figure 9C:
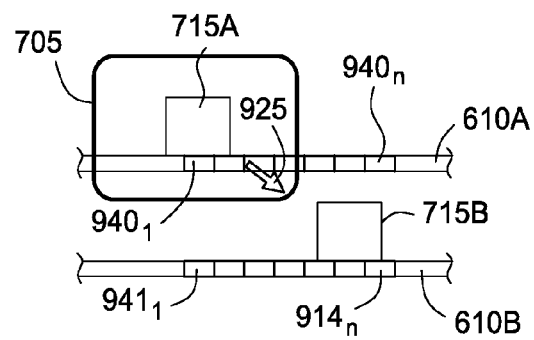

FIGS. 9A-9C illustrate example presentations of information related to an item, according to one embodiment. As discussed above, the presentation of information may be based upon some or all of the items that are identified as being within the person's field of view. For ease of description, scene 900 of FIG. 9A illustrates a single item 715A within the customer's field of view 705; this could also represent an example in which one item is identified from several items as being a customer focused item. However, similar techniques may be applied to a field of view or a customer focus that includes more than one item. In some embodiments, the computing system may present information to the customer about a particular item, based on the item 715A. The presented information may relate to the same item 715A and/or to one or more different items. The different items may include other items located within the customer's field of view 705, and may include items (such as item 715B) that are not included within the field of view 705. In some embodiments, the information may be determined and timely presented so as to influence the customer to purchase the particular item(s).

FIG. 9B illustrates several example presentations 910 of information to a customer. The presentations may be delivered in real-time to the customer using any suitable manner, such as a visual output (e.g., graphical and/or textual), audio-based output, and/or other sensory output (e.g., haptic). While the presentations 915, 920, 925 are shown as textual presentations for simplicity, it is possible for the presentations to be spoken or presented in any suitable alternative manner. In one example, a presentation may be displayed by a wearable computing device of the customer, such as a visual overlay on a display of the wearable computing device as discussed above with respect to FIGS. 5A and 5B. In another example, a presentation may be transmitted as a message to the customer's mobile computing device, causing text or graphics to be displayed on the mobile computing device and causing the device to vibrate.

Presentation 915 indicates a customer preference for a second item 715B to the currently viewed or focused item 715A. Presentation 915 generally suggests that the customer may also prefer the second item 715B. The customer preference may be determined based on compiled previous shopping data for other customers. The shopping data may include separate statistics for the two items, for example, based on historical purchase data for each item. The shopping data may also include compiled information that directly interrelates the two items. For example, in previous shopping experiences, other customers also focused on item 715A (e.g., based on determined fields of view) but ultimately declined to purchase item 715A in favor of item 715B.

Presentation 920 indicates that a promotion is available for the second item 715B. Presentation 920 may reflect a sales promotion or prices already in effect (e.g., a reporting function), or the promotion may be dynamically generated to encourage the customer to purchase item 715B. For example, manufacturers or stores may wish to promote item 715B over item 715A, and the promotion may be presented to the customer in real-time. As discussed above, in some embodiments, the promotion may be determined, as well as the timing of its presentation to the customer, based on a determined level of customer interest in an item.

Presentation 925 indicates that item 715A would have a negative impact on the customer's goals. The presentation 925 may be based on customer profile data such as customer preferences and/or programs. Examples of programs may include fitness, nutrition, or health goals, money management goals, etc. Although not shown here, one embodiment may present the information to the customer upon which the negative impact determination was made. If the system determines that item 715A is incompatible with specified goals or preferences, or that better alternative items exist consistent with the customer's goals/preferences, the system may recommend one or more alternative items for presentation to the customer.

FIG. 9C illustrates several example presentations of information to a customer. Like the presentations discussed above, the presentations may be delivered in real-time to the customer using any suitable manner, such as a visual output (e.g., graphical and/or textual), audio-based output, and/or other sensory output (e.g., haptic). The presentations may be output using a customer's worn or carried computing device, or using output hardware (e.g., displays, speakers, etc.) that is disposed within the shopping environment. For example, LEDs or other visual display elements may be included in the shelving units, such as display elements $940_{1-n}$ and $941_{1-n}$.

As shown, a single item 715A is included within a customer's field of view 705, and item 715B is located outside the field of view. Of course, similar techniques may be applied to a field of view or a customer focus that includes more than one item. In cases where the item 715A (already included in the field of view 705) is recommended for presentation to the customer, the system may display various indicators that highlight the item 715A to the user. For example, if the field of view 705 represents the customer view through a head-worn computing device such as wearable computing device 500, the system may display colors, shapes, etc. that visually enhance the item 715A, or may reduce the visibility of other items in the field of view (e.g., gray out). The system may also display location information of the item 715A, for example, by illuminating one or more of the display elements $940_{1-n}$, $941_{1-n}$ nearest to the item 715A.

In cases where an item is recommended for presentation that is not disposed within the field of view 705 (e.g., item 715B), the system may output directional information from the current field of view 705 to the item. For example, the system may display an arrow 935 overlay indicating the relative direction from the field of view 705 or item 715A to the target item 715B. The system may also provide directional information using one or more of the display elements 940, 941. For example, the display elements 940, 941 may be illuminated in sequence from left to right to guide the person's eye toward item 715B. Of course, the various types of information discussed here (e.g., highlighting, location, and directional) may additionally or alternately be provided by non-visual means to the customer, such as audio or haptic outputs.

Figure 10:
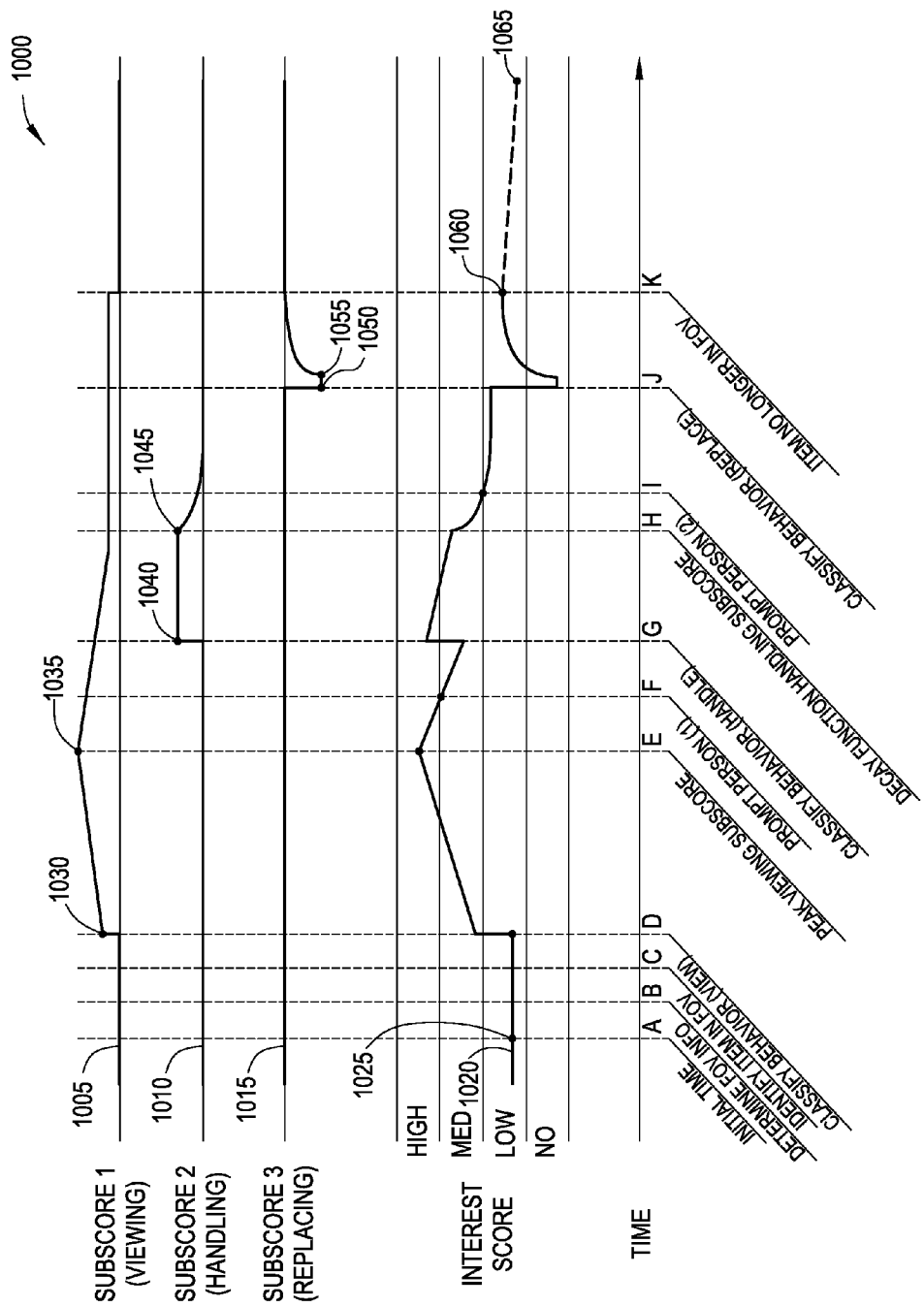
FIG. 10 is a graph showing an example calculation of an interest score for an item, according to one embodiment.

FIG. 10 is a graph showing an example calculation of an interest score for an item, according to one embodiment. The graph 1000 includes separate plots of first, second, and third subscores 1005, 1010, 1015 related to different predefined behavior types (i.e., viewing the item, handling the item, and replacing the item, respectively), as well as a plot of an interest score 1020 for the item. In some embodiments, the various behavior subscores may be combined to update the interest score 1020. In one embodiment, the subscores may be summed. In another embodiment, the subscores may be weighted before summing (e.g., using values included in the behavior-interest information 415 from personal profile 236$_1$).

In some embodiments, the interest score for the item has an initial value 1025 at Time A. In one embodiment, the initial value may be a default value, which may be zero or a non-zero value. In one embodiment, the interest scores may be maintained in memory even when the person is not interacting with the item, and the initial value is based on this stored interest score.

At Time B, the system or specific computing device determines field of view (FOV) information for the person. At Time C, and following processing on the FOV information, the system identifies particular items within the person's FOV. At Time D, after processing on behavior information for the person, a behavior of the person is determined according to one of a number of predefined behavior types. The behavior information is determined prior to Time D, but may be performed concurrent with determining the FOV information and/or identifying items within the FOV, or performed separately from these.

Upon classifying the behavior at Time D, the subscore related to the classified behavior (here, subscore 1005) is modified. The subscores may be modified using any suitable function, which in some cases may be a time-based function. As shown, subscore 1005 receives an step increase to an initial value 1030 at Time D, and gradually increases to a maximum value 1035 at Time E. While shown here as a linear increase, other functions are contemplated, such as an exponential function, step function, or a non-linear function. The time corresponding with the maximum value 1035 may be selected and/or adaptively updated based on behavior information for the person and/or other people, e.g., to find an optimal interest level. The subscore 1005 may gradually decrease from the maximum value 1035 to a zero value or non-zero value. Of course, multiple increases and/or decreases for a subscore function are also possible.

The changes in the subscore 1005 are also reflected in changes to the interest score 1020. As discussed above, the various subscores may be combined in a simple sum or weighted sum, or according to any other feasible function. As subscore 1005 decreases following Time E, the interest score 1025 may also decrease levels of interest ("High" to "Med"). In one embodiment, upon determining a change in interest level, the system may prompt the person a first time at Time F with information regarding this item or another item, such as promotions, in order to reinvigorate the person's interest in the item or an alternative item.

At Time G, the system determines that the person is handling the item, which results in a change to the subscore 1010 and the total interest score 1020. As shown, the subscore 1010 includes a step increase to initial value 1040, which value is maintained (i.e., value 1045) until a decay function is applied to the subscore 1010 beginning at Time H. The difference between Times G and H may be a predetermined amount of time.

The system may determine that the person's handling of the item was performed in response to the first prompt at Time F. Accordingly, the system may update the personal profile of the person to reflect the effectiveness of the prompt, such as what information was transmitted, the manner of presentation of the information, etc. so that future prompts are similarly effective for this person and/or other people.

At Time I, the interest score 1020 decreases and crosses from a "Med" interest level to a "Low" interest level. At Time I, the system prompts the person a second time. The second prompt may be different than the first, such as including information for a different item than the first prompt, including a greater promotional discount, and/or presenting the information in different manner. While another decreasing level change occurred in the interim between Times F and I (specifically, between Times G and H), in some cases the system may not prompt the person at the interim change. In one example, the system may not issue another prompt if the level change occurs within a certain amount of time of the previous prompt (e.g., so as not to irritate the person with a flood of item information). In another example, the system may not issue another prompt where the level change is the same as the previous level change (e.g., from "High" to "Med" in both cases).

At Time J, the system classifies the person's behavior as replacing the item. Generally, this indicates a decrease in the person's interest, which may correspond to a negative subscore 1015 component added to the interest score 1020. In one embodiment, for subscore 1015, the initial value 1050 may be held for a predetermined amount of time (until value 1055), and a decay function applied afterward. In this way, the act of replacing the item does not have a long-term effect on the person's interest score—in other words, the person may not be interested in the item at the moment, but may still have some item interest in future interactions. The function or its parameters may be determined by the person's preferences, the type of the item (e.g., a necessity), and/or the person's shopping history. For example, if the person has recently purchased a pallet of tomato sauce, the fact that the person replaced a can of tomato sauce on the shelf may have a lesser impact on the person's overall interest level in the item than had the person not interacted with the item previously.

At Time K, upon determining that the person is no longer interacting with the item (e.g., walked away, not looking, etc.) a final value 1060 of the interest score 1020 may be determined. This final 1060 value may be stored in memory for the person, and used as an initial value in a subsequent interaction with the item. In one embodiment, a decay function is applied to the final value 1060, such that the value may decrease to a lesser value 1065 until the next interaction with the item. In one embodiment, the value may decrease to zero.

Figure 11A:
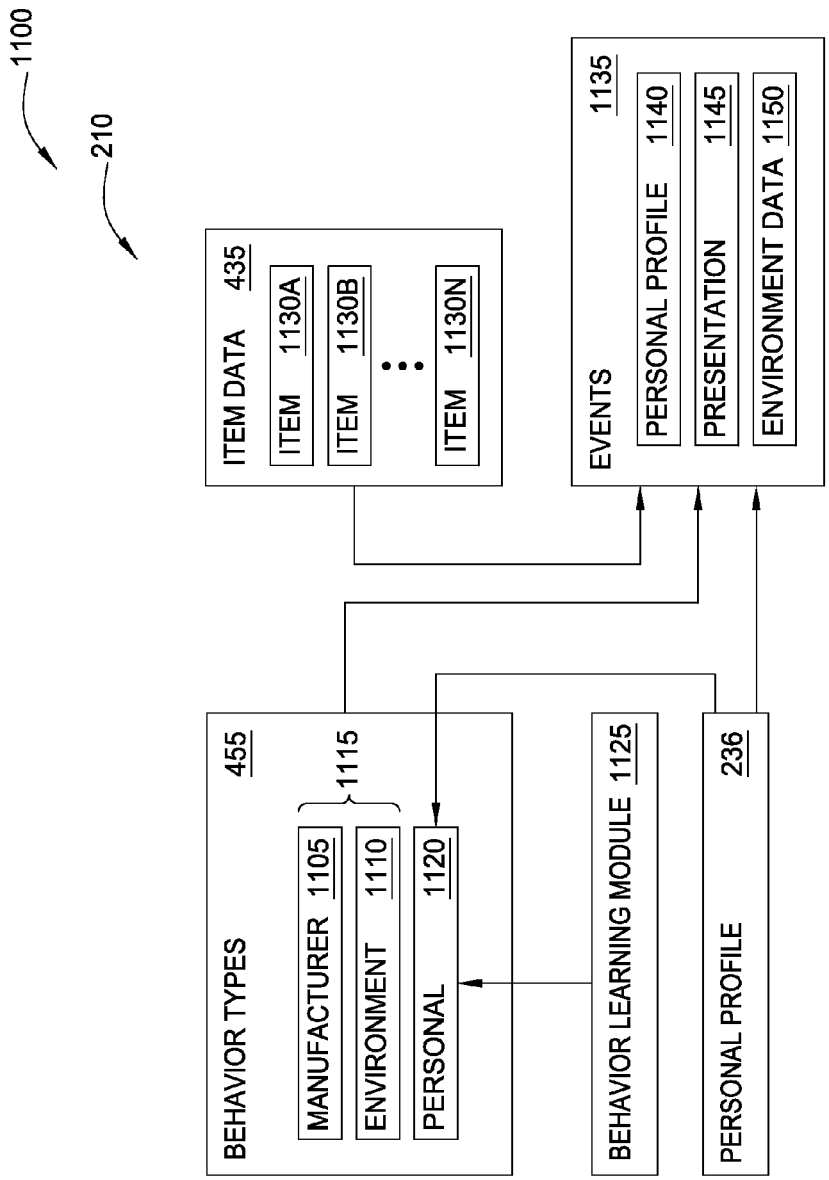
FIG. 11A illustrates an exemplary arrangement for triggering events based on behavior information, according to one embodiment.

FIG. 11A illustrates an exemplary arrangement for triggering events based on behavior information, according to one embodiment. The arrangement 1100 may include various components of memory 210.

Predefined behavior types 455 are used to classify aspects of a person's interaction with one or more items. The behavior types 455 may be provided by various sources, such as item manufacturers, individual stores (corresponding to the environment) and/or higher levels (e.g., corporate), as well as customized by and for individual persons. As shown, behavior types 455 may include an item manufacturer-specified set 1105 of behavior types, an environment-specific set 1110 of behavior types, and a personal set 1120 of behavior types.

In one embodiment, the various behavior types may be applied equally, irrespective of a provider or a grouping of the behavior types. In other embodiments, groups of behavior types may be arranged into a hierarchy defining relative priority between the groups. In one embodiment, the hierarchical priority may dictate how sensed behavior information is interpreted—that is, for given behavior information, what classified behavior results? For example, according to one group of behavior types, a person moving a finger along the surface of an item might indicate that the person is reading labeling information for the item, while another group associates the same movement with feeling the texture of the item surface. The group of behavior types having relative priority thus determines which classification is made, and which event(s) occur as a result.

In another embodiment, the hierarchical priority may dictate which event(s) are performed. For example, two different groups of behavior types may recognize the same behavior but prescribe different event(s) to occur responsively. Here, the group with relative priority may have its corresponding events occur, to the exclusion of those events prescribed by the other group. For example, the item manufacturer-specified set 1105 of behavior types is applied but may be overridden by environment-specific set 1110 of behavior types. In a similar fashion, the personal set 1120 of behavior types could override both sets 1105, 1110.

The personal set 1120 of behavior types may be associated with a personal profile 236. Accordingly, in some cases, the person must first be identified within the environment through visual recognition, an associated personal computing device, etc. to enable their personalized behavior types. If the person is not identified, a default set 1115 of behavior types may be applied to the person's interactions with items.

The personal set 1120 may be learned, e.g., using a behavior learning module 1125. In some embodiments, various behaviors are identified from the visual behavior information. The identified behaviors may then be verified (e.g., were the behaviors intended by the person?) and associated with performing a particular event or events 1135.

Determined behaviors may apply similarly across all items, or may be specific to individual items or groups of items. For example, a particular behavior (say, moving a finger along the item surface) when associated with item 1130A causes a first event to occur (e.g., send nutrition information for the item to a mobile computing device associated with the person). The same behavior, when associated with a different item 1130B, causes a second, different event to occur (e.g., prompt the person with an option to watch a video about the manufacturing process for the item).

Events 1135 are generally associated with a number of different possible information transfers, which information may benefit the person, the store, item manufacturers, etc. The events 1135 may be divided into several categories, such as updating a personal profile 1140 for the person, sending information for presentation 1145 to the person, updating environment data 1150 for the store, and so forth. Each behavior type may be associated with one or more events 1135, which may occur in sequence or overlapping in time. For example, a person handling an item may cause several events to occur, such as a presentation of item-related information to the person's associated computing device, as well as updating the person's personal profile and the environment data to reflect the interaction with the item.

Figure 11B:
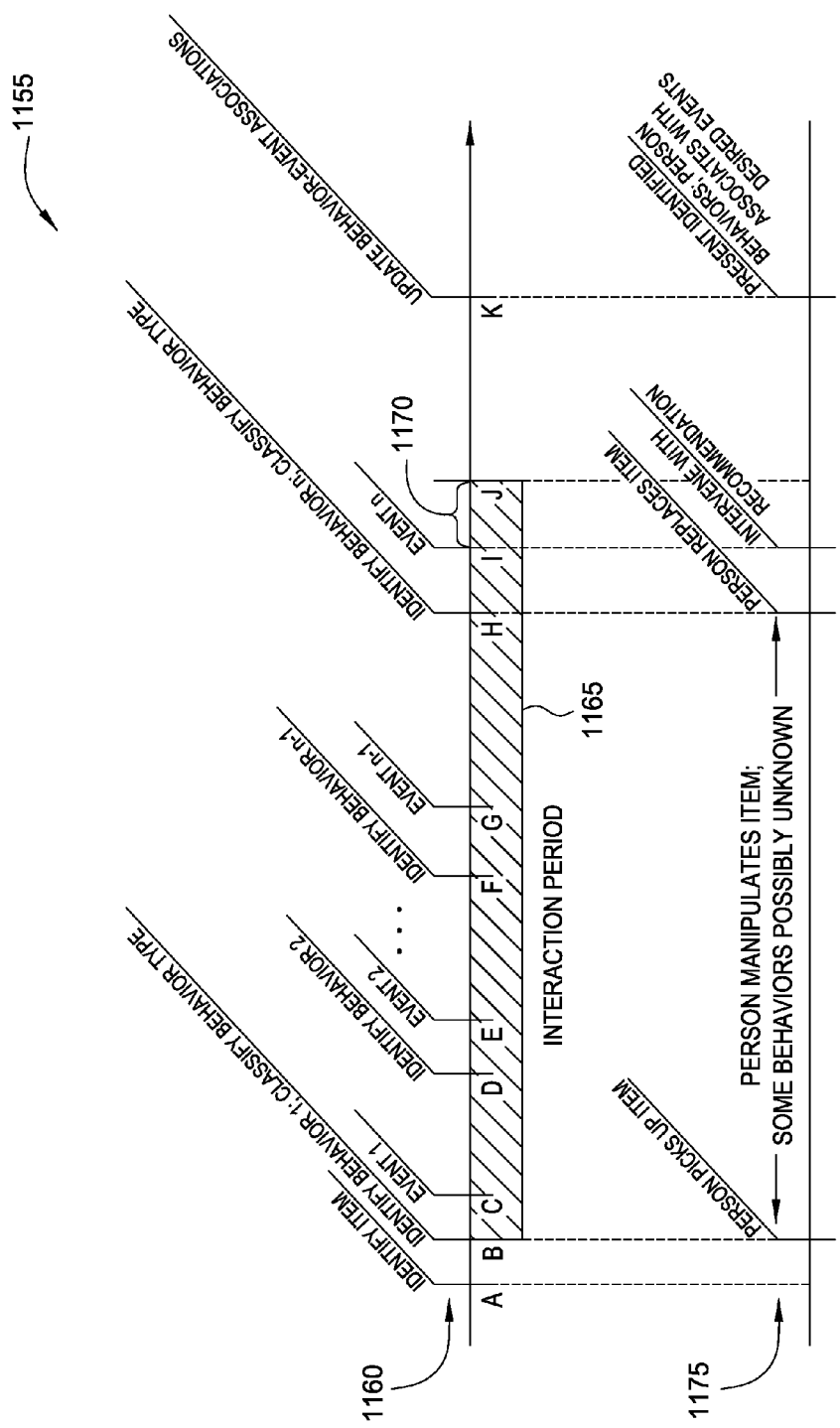
FIG. 11B is a graph illustrating an exemplary interaction sequence for a person with an item, according to one embodiment.

FIG. 11B is a graph 1155 illustrating an exemplary interaction sequence for a person with an item, according to one embodiment. Generally, plot 1175 represents one possible example of the interaction sequence shown in plot 1160. The interaction sequence is not drawn to scale, and the person of ordinary skill will understand that the occurrences depicted in the sequence may have a different ordering, may include more or less occurrences, and so forth.

At Time A, the system visually identifies an item. The item may be included within a field of view of the person and identified using a first visual sensor in the environment. At Time B, the system visually identifies a behavior (Behavior 1) of the person relative to the identified item. In one embodiment, the identified Behavior 1 is also classified as a predetermined behavior type. In one embodiment, the predetermined behavior types may include a group of behaviors that signal the beginning of the person's interaction with the item. Some example interaction-beginning behaviors include the person picking up the item from a shelf, the person pointing at the item, the person staring at the item, and so forth. In one embodiment, the group of interaction-beginning behaviors is included as a sub-group of the environment-specific set 1110 of behavior types. In some embodiments, Time B occurs before Time A, or overlapping in time. The particular ordering may not be the predominant consideration, but that both the item and behavior(s) are identified for the interaction.

An interaction period 1165 begins upon identification of the item and Behavior 1. The interaction period 1165 generally continues until a particular behavior is identified that signals the end of the person's interaction with the item (i.e., Behavior n occurring at Time H). In some embodiments, the interaction period 1165 may extend beyond identification of an interaction-ending behavior. The interaction-ending behaviors may be included as a sub-group of the environment-specific set 1110 of behavior types. Some example interaction-ending behaviors include the person placing the item in a cart or basket, the person replacing the item onto a shelf, the person walking away from the interaction location with or without the item, and so forth.

During the interaction period 1165, the person may perform any number of behaviors with respect to the item. In some cases, not all of the identified behaviors correspond to one of the predefined behavior types 455. The system may analyze the acquired image information to characterize the unknown behaviors, such as the time progression of the person's movements (e.g., limbs, facial features, etc.), relative position and orientation of the item, and so forth. Each unknown behavior may be stored by the system and in some cases, validated and associated with one or more events.

As shown, Behavior 2 is identified at Time D, which may be followed by a corresponding Event 2 at Time E. Similarly, Behavior n−1 follows at Time F and Event n−1 at Time G. The set of Behaviors 2 through n−1 may include a mix of predefined behavior types 455 and unknown behavior types. For behaviors of predefined behavior types 455, events occurring responsively generally include the associated events 1135. For unknown behavior types, events may include characterization of the image information and storing the behavior for later validation.

While the system may characterize and store the occurrence of an unknown behavior, the system may not initially know what information the person seeks responsive to the unknown behavior. In one embodiment, the system may interactively prompt the person through an associated mobile computing device or other environment computing device (e.g., a nearby display). In another embodiment, the system compiles unknown behavior for the person to access at another time, whether within the environment or at the person's leisure (e.g., using their phone app). For example, the access may occur at Time K, after the interaction period 1165 is concluded.

In one embodiment, the system may initially validate the behavior (e.g., asking the person "Did you mean to perform this behavior?") before associating the behavior with one or more information presentation events. In one embodiment, the system may display a list of possible information presentations and/or suggestions based on other persons' behavior-event associations.

At Time H, an interaction-ending Behavior n is identified and a corresponding Event n performed at Time I. In some cases, the system may intervene in an attempt to influence the person's decision-making. For example, an intervention may be useful where the person has replaced the item to the shelf or otherwise appears uninterested in the item. Accordingly, the information presentation to the person includes offering a recommendation or promotion, etc. to reinvigorate the person's interest in the item or in another item. The interaction period 1165 may continue for a period 1170 beyond Time I to determine whether the person will resume the interaction with the item in response to the information presented with Event n. The length of period 1170 may be a predetermined amount of time (e.g., 10 seconds) or may reflect a determination that the person is not interested in the item (e.g., walks away from the area).

Figure 12:
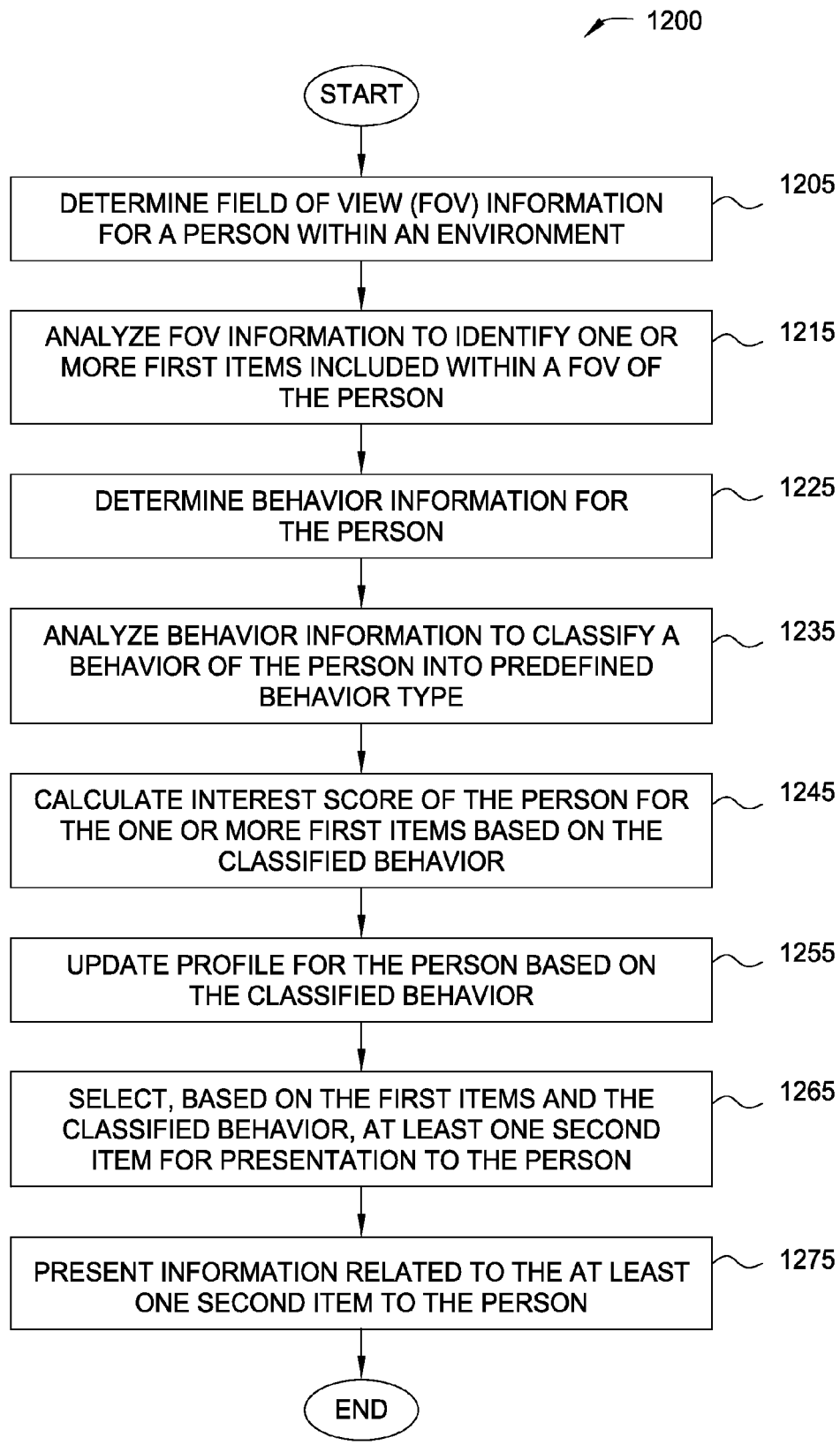
FIG. 12 illustrates a method to influence a person within an environment having a plurality of items available for selection, according to one embodiment.

FIG. 12 illustrates a method to influence a person within an environment having a plurality of items available for selection, according to one embodiment. Method 1200 may generally be used in conjunction with the various environments and systems discussed above.

Method 1200 begins at block 1205, where field of view information is determined for the person within the environment. Determining a field of view may include a "direct" determination, such as capturing an image from a body-worn, forward-looking camera (i.e., the image strongly corresponds to the customer's eye gaze). Alternatively (or in addition to the direct determination), the field of view may be determined "indirectly" by capturing images of the shopping environment and performing image processing to determine various aspects. The aspects may include the determined position and orientation of one or more of the customer's body, head, shoulders, eyes, arms, hands, etc. The images may be captured by visual sensors that are worn or disposed throughout the shopping environment.

At block 1215, the field of view information is analyzed to identify one or more first items that are included within the person's field of view. In one embodiment, the analysis may include performing image processing on a captured image that reflects the person's field of view (e.g., from a forward-looking camera). In another embodiment, identifying items may include referencing coordinate data determined for the person's field of view against a known store layout that includes item location information. In such an embodiment, image processing may not be necessary to identify the one or more first items.

At block 1225, behavior information for the person is determined. In one embodiment, block 1225 begins at a time following determining the field of view information. In one embodiment, the two determinations may be performed contemporaneously. The behavior information may be captured using one or more visual sensors that are worn or disposed throughout the environment. In one embodiment, a particular visual sensor may be used to capture both behavior and field of view information. In one embodiment, one visual sensor (e.g., a body-worn visual sensor) captures field of view information while a second visual sensor (e.g., a visual sensor disposed elsewhere) captures behavior information.

At block 1235, the behavior information is analyzed to classify a behavior of the person into a predefined behavior type. This analysis may be performed by the same computing device that analyzes the field of view information, or by different computing devices that are networked. The predefined behavior types may include, without limitation, handling one or more first items, reading the one or more first items, selecting the one or more first items, returning the one or more first items, and/or declining to approach an area containing the one or more first items.

At block 1245, an interest score of the person for the one or more first items is optionally calculated based on the classified behavior. The interest score may also reflect factors or specific values related to the classified behavior, such as the length of time the behavior was performed, the time between subsequent classified behaviors, the sequence of classified behaviors for the person, etc. The interest score may be calculated using behavior-interest information maintained for the person in a personal profile and/or based on similar information corresponding to other personal profiles. The interest score may be dynamically updated as the person moves through the environment.

At block 1255, the profile for the person is optionally updated based on the classified behavior. In one embodiment, this includes updating the person's behavior-interest information.

At block 1265, at least one second item is selected for presentation to the person based on the first items and the classified behavior. In one embodiment, the second item may include one of the first items. In one embodiment, the second item is not included within the person's field of view. The selection may be based on decisional logic for recommending a particular item for sale, based on historical shopping data for the person (and/or other people), personal preferences or programs, the person's interest scores and/or levels, and so forth.

At block 1275, information related to the at least one second item is presented to the person. Presenting information may be done in any suitable manner, such as displaying textual or graphical information in a visual overlay, displaying directional information to the person, or outputting sound or other feedback. The information may be related to the properties of the second item (e.g., price, nutrition information, etc.) or to historical shopping data, promotions, or other person-specific preferences or programs. The timing of the presentation may be determined based on the person's interest scores or other timing considerations that are collectively intended to influence a person's interactions (such as shopping purchases). Method 1200 is completed following block 1275.

Figure 13:
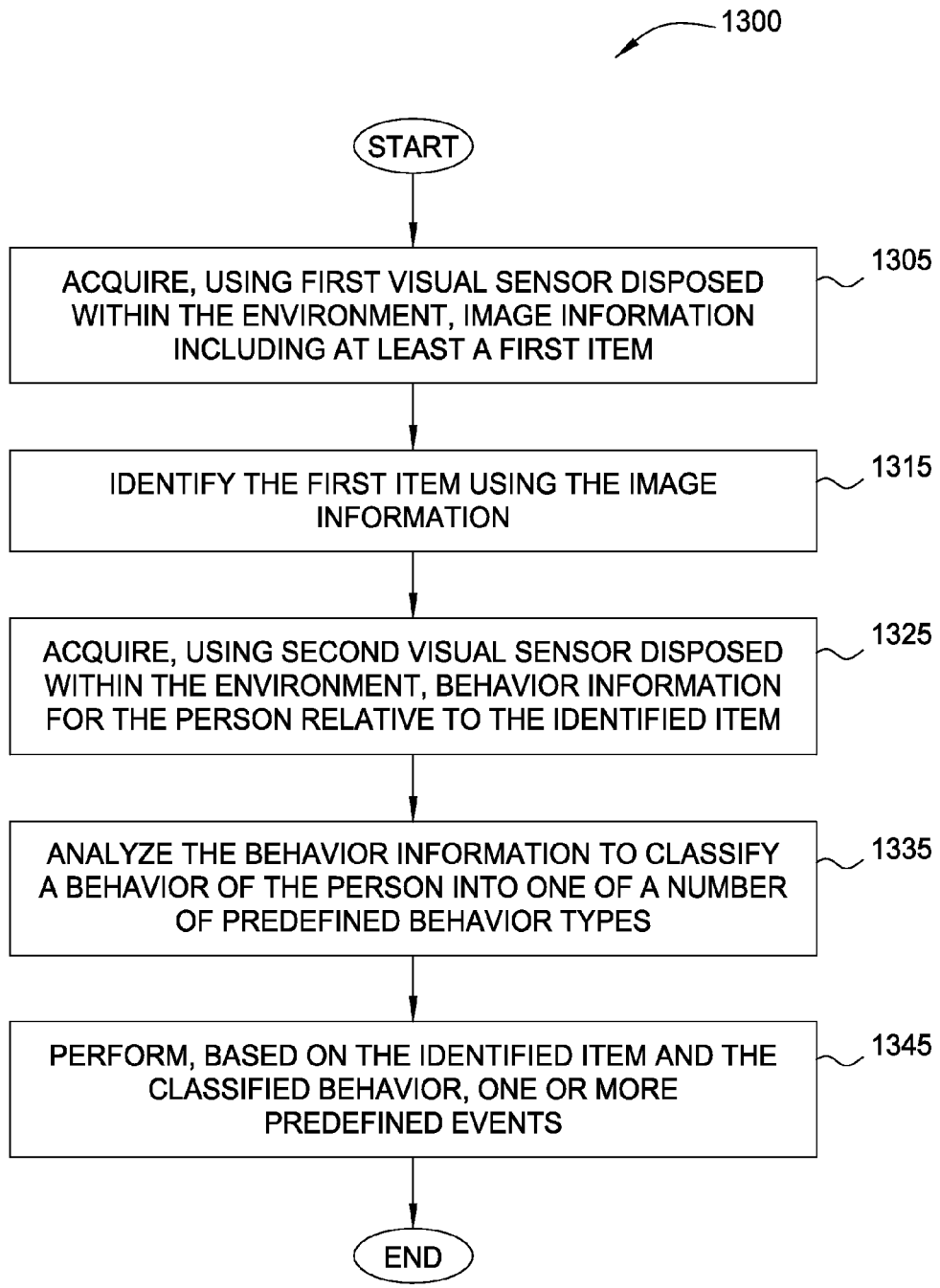
FIG. 13 illustrates a method of triggering events during an interaction for a person with an item, according to one embodiment.

FIG. 13 illustrates a method of triggering events during an interaction for a person with an item, according to one embodiment. Method 1300 may generally be used in conjunction with the various environments and systems discussed above.

Method 1300 begins at block 1305, where a system acquires, using a first visual sensor disposed within the environment, image information including at least a first item. The image information may be included in field of view information for the person. In some embodiments, the first visual sensor is included in a mobile computing device associated with the person.

At block 1315, the first item is identified using the image information. Identifying the item may include image processing techniques, and may further include referencing the person's current location and corresponding location data for the item.

At block 1325, the system acquires, using a second visual sensor, behavior information for the person relative to the identified item. In some embodiments, the second visual sensor is one of a plurality of visual sensors disposed throughout the environment.

At block 1335, the behavior information is analyzed to classify a behavior of the person into one of a number of predefined behavior types. The predefined behavior types may include a hierarchy of behavior types from different providers, such as the item manufacturer, the store environment, as well as the individual person.

At block 1345, the system performs one or more predefined events based on the identified item and the classified behavior. The classified behavior type may begin an interaction period of the person with the item, during which the person may perform multiple other behaviors related to the item, some of which may not be included in the predefined behaviors. The predefined events may include several categories, such as updating the person's associated profile, sending information for presentation to the person, updating store environment data, and so forth. Method 1300 is completed following block 1345.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a user may access applications (e.g., a retail store app for a mobile computing device) or related data (e.g., compiled shopping data) available in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method to trigger one or more events during an interaction of a person with an item and within an environment having a plurality of items, the method comprising:
   acquiring, using a first visual sensor disposed within the environment, image information including the item;
   identifying the item using the image information;
   acquiring, using a second visual sensor disposed within the environment, behavior information for the person relative to the identified item, the behavior information comprising one or more images;
   analyzing, using one or more computer processors, the behavior information to identify at least a first behavior of the person, the analysis comprising:
      analyzing a first image of the one or more images, using the computer processors, to identify a body part of the person;
      determining, using the computer processors, an angle formed by a position of the body part relative to a reference direction;
      analyzing a second image of the one or more images, using the computer processors and based at least in part on the angle, to identify a portion of the second image comprising a field of view (FOV) of the person;
      analyzing the identified portion of the second image to determine that the item falls within the FOV of the person; and determining, based on the behavior information, a duration of time the identified item falls within the FOV of the person;

determining, using the one or more computer processors and based, at least in part, on the duration of time, that the first behavior corresponds to one of a number of predefined behavior types, and in response classifying the first behavior into the one of a number of predefined behavior types based, at least in part, on the duration of time;

performing, based on the identified item and the classified first behavior, one or more predefined events;

analyzing, using one or more computer processors, the behavior information to identify a second behavior of the person; and determining, using the one or more computer processors, that the second behavior does not correspond to a predefined behavior type, and in response characterizing the second behavior, based on the behavior information, and storing the characterized second behavior.

2. The computer-implemented method of claim 1, wherein the one or more predefined events includes one or more of updating a personal profile of the person, presenting information to the person, and updating environmental data.

3. The computer-implemented method of claim 1, wherein the predefined behavior types are specified by two or more providers and prioritized based on a corresponding provider.

4. The computer-implemented method of claim 1, further comprising:

validating the stored second behavior; and associating the validated behavior with one or more predefined events.

5. The computer-implemented method of claim 1, wherein the first behavior signals a beginning of an interaction period of the person with the item, and further comprising:

during the interaction period, identifying at least a third behavior of the person.

6. The computer-implemented method of claim 5, wherein the third behavior signals an end of the interaction period, and further comprising:

responsive to identifying the third behavior, presenting at least one of recommendation information and promotion information to the person.

7. The computer-implemented method of claim 1, wherein the body part comprises at least one of a head of the person, a shoulder of the person, or an eye of the person.

8. A computer program product to trigger one or more events during an interaction of a person with an item and within an environment having a plurality of items, the computer program product comprising:

a computer-readable storage medium having computer-readable program code embodied therewith, the computer-readable program code executable by one or more computer processors to perform an operation that includes:

acquiring, using a first visual sensor disposed within the environment, image information including the item;

identifying the item using the image information;

acquiring, using a second visual sensor disposed within the environment, behavior information for the person relative to the identified item, the behavior information comprising one or more images;

analyzing the behavior information to identify at least a first behavior of the person, the analysis comprising:

analyzing a first image of the one or more images to identify a body part of the person;

determining an angle formed by a position of the body part relative to a reference direction;

analyzing a second image of the one or more images, based at least in part on the angle, to identify a portion of the second image comprising a field of view (FOV) of the person;

analyzing the identified portion of the second image to determine that the item falls within the FOV of the person; and determining, based on the behavior information, a duration of time the identified item falls within the FOV of the person;

determining, based, at least in part, on the duration of time, that the first behavior corresponds to one of a number of predefined behavior types, and in response classifying the first behavior into the one of a number of predefined behavior types based, at least in part, on the duration of time;

performing, based on the identified item and the classified first behavior, one or more predefined events;

analyzing the behavior information to identify a second behavior of the person; and determining that the second behavior does not correspond to a predefined behavior type, and in response characterizing the second behavior, based on the behavior information, and storing the characterized second behavior.

9. The computer program product of claim 8, wherein the one or more predefined events includes one or more of updating a personal profile of the person, presenting information to the person, and updating environmental data.

10. The computer program product of claim 8, wherein the predefined behavior types are specified by two or more providers and prioritized based on a corresponding provider.

11. The computer program product of claim 8, wherein the operation further includes:

validating the stored second behavior; and associating the validated behavior with one or more predefined events.

12. The computer program product of claim 8, wherein the first behavior signals a beginning of an interaction period of the person with the item, and wherein the operation further includes:

during the interaction period, identifying at least a third behavior of the person.

13. The computer program product of claim 12, wherein the third behavior signals an end of the interaction period, and wherein the operation further includes:

responsive to identifying the third behavior, presenting at least one of recommendation information and promotion information to the person.

14. The computer program product of claim 8, wherein the body part comprises at least one of a head of the person, a shoulder of the person, or an eye of the person.

15. A system to trigger one or more events during an interaction of a person with an item and within an environment having a plurality of items, the system comprising:

one or more computer processors;

at least first and second visual sensors disposed within the environment and communicatively coupled with the one or more computer processors; and a memory containing program code which, when executed by the one or more computer processors, performs an operation that includes:
  acquiring, using the first visual sensor, image information including the item;
  identifying the item using the image information;
  acquiring, using the second visual sensor, behavior information for the person relative to the identified item, the behavior information comprising one or more images;
  analyzing the behavior information to identify at least a first behavior of the person, the analysis comprising:
    analyzing a first image of the one or more images to identify a body part of the person;
    determining an angle formed by a position of the body part relative to a reference direction;
    analyzing a second image of the one or more images, based at least in part on the angle, to identify a portion of the second image comprising a field of view (FOV) of the person;
    analyzing the identified portion of the second image to determine that the item falls within the FOV of the person; and
  determining, based on the behavior information, a duration of time the identified item falls within the FOV of the person;
  determining, based, at least in part, on the duration of time, that the first behavior corresponds to one of a number of predefined behavior types, and in response classifying the first behavior into the one of a number of predefined behavior types based, at least in part, on the duration of time;
  performing, based on the identified item and the classified first behavior, one or more predefined events;
  analyzing the behavior information to identify a second behavior of the person; and
  determining that the second behavior does not correspond to a predefined behavior type, and in response characterizing the second behavior, based on the behavior information, and storing the characterized second behavior.

16. The system of claim 15, wherein the one or more predefined events includes one or more of updating a personal profile of the person, presenting information to the person, and updating environmental data.

17. The system of claim 15, wherein the predefined behavior types are specified by two or more providers and prioritized based on a corresponding provider.

18. The system of claim 15, wherein the operation further includes:
  validating the stored second behavior; and
  associating the validated behavior with one or more predefined events.

19. The system of claim 15, wherein the first behavior signals a beginning of an interaction period of the person with the item, and wherein the operation further includes:
  during the interaction period, identifying at least a third behavior of the person, wherein the third behavior signals an end of the interaction period; and
  responsive to identifying the third behavior, presenting at least one of recommendation information and promotion information to the person.

20. The system of claim 15, wherein the body part comprises at least one of a head of the person, a shoulder of the person, or an eye of the person.

* * * * *